(12) United States Patent
Zimmerman

(10) Patent No.: US 11,005,163 B2
(45) Date of Patent: May 11, 2021

(54) LENSED BASE STATION ANTENNAS THAT GENERATE ANTENNA BEAMS HAVING OMNIDIRECTIONAL AZIMUTH PATTERNS

(71) Applicant: CommScope Technologies LLC, Hickory, NC (US)

(72) Inventor: Martin L. Zimmerman, Chicago, IL (US)

(73) Assignee: CommScope Technologies LLC, Hickory, NC (US)

(*) Notice: Subject to any disclaimer, the term of this patent is extended or adjusted under 35 U.S.C. 154(b) by 126 days.

(21) Appl. No.: 16/251,338

(22) Filed: Jan. 18, 2019

(65) Prior Publication Data
US 2020/0144701 A1 May 7, 2020

Related U.S. Application Data

(60) Provisional application No. 62/626,818, filed on Feb. 6, 2018.

(51) Int. Cl.
*H01Q 21/26* (2006.01)
*H01Q 1/24* (2006.01)
(Continued)

(52) U.S. Cl.
CPC ............ *H01Q 1/246* (2013.01); *H01Q 1/36* (2013.01); *H01Q 1/50* (2013.01); *H01Q 15/08* (2013.01);
(Continued)

(58) Field of Classification Search
CPC ............ H01Q 1/36; H01Q 1/246; H01Q 1/50; H01Q 1/2291; H01Q 15/08; H01Q 19/10;
(Continued)

(56) References Cited

U.S. PATENT DOCUMENTS

| 3,781,900 A | 12/1973 | Fuller et al. |
| 5,771,017 A | 6/1998 | Dean et al. |

(Continued)

FOREIGN PATENT DOCUMENTS

| DE | 4430832 A1 | 11/1995 |
| WO | WO 9213373 A1 | 8/1992 |
| WO | WO9310572 A1 | 5/1993 |

OTHER PUBLICATIONS

Notification of Transmittal of the International Search Report and the Written Opinion of the International Searching Authority, or the Declaration, corresponding to International Application No. PCT/US2019/013910, dated Jul. 5, 2019.

(Continued)

*Primary Examiner* — Awat M Salih
(74) *Attorney, Agent, or Firm* — Myers Bigel, P.A.

(57) ABSTRACT

A base station antenna includes a reflector having a plurality of pairs of opposed faces, a connector port, a plurality of radiating elements mounted to extend outwardly from the respective faces of the reflector, where each of the radiating elements is coupled to the connector port, and a plurality of RF lenses, each RF lens mounted outwardly of a respective one of the radiating elements and associated with the respective radiating element. The number of radiating elements coupled to the connector port is equal to the number of faces on the reflector.

20 Claims, 16 Drawing Sheets

(51) Int. Cl.
*H01Q 1/36* (2006.01)
*H01Q 1/50* (2006.01)
*H01Q 15/08* (2006.01)
*H01Q 19/10* (2006.01)
*H01Q 21/29* (2006.01)
*H04B 7/0495* (2017.01)

(52) U.S. Cl.
CPC .............. *H01Q 19/10* (2013.01); *H01Q 21/26* (2013.01); *H01Q 21/29* (2013.01); *H04B 7/0495* (2013.01)

(58) Field of Classification Search
CPC ........ H01Q 19/06; H01Q 21/26; H01Q 21/29; H01Q 21/205; H01Q 25/005; H04B 7/0495
See application file for complete search history.

(56) References Cited

U.S. PATENT DOCUMENTS

| | | |
|---|---|---|
| 6,301,476 B1 | 10/2001 | Monte et al. |
| 6,323,817 B1 | 11/2001 | Ramanujam et al. |
| 6,426,814 B1 | 7/2002 | Berger et al. |
| 7,671,820 B2 | 3/2010 | Tokoro et al. |
| 9,722,326 B2 | 8/2017 | Chistyakov et al. |
| 9,819,094 B2 | 11/2017 | Matitsine et al. |
| 2003/0038752 A1 | 2/2003 | Park |
| 2007/0008236 A1 | 1/2007 | Tillery et al. |
| 2008/0238810 A1* | 10/2008 | Winsor .................. H01Q 15/08 343/911 R |
| 2008/0278394 A1 | 11/2008 | Koh et al. |
| 2009/0296223 A1 | 12/2009 | Werner et al. |
| 2012/0098725 A1 | 4/2012 | Lytle et al. |
| 2014/0176377 A1 | 6/2014 | Merlet et al. |
| 2015/0070230 A1 | 3/2015 | Bradley et al. |
| 2015/0303585 A1 | 10/2015 | Chistyakov et al. |
| 2017/0256847 A1 | 9/2017 | Vollmer et al. |
| 2017/0279202 A1 | 9/2017 | Galla et al. |
| 2017/0331194 A1 | 11/2017 | Hsu et al. |

OTHER PUBLICATIONS

"Datasheet for SBA Smart Omni, Long, 2.3-2.4 GHz, Airspan P/Ns: Tilt 0°: SBAL-2.3-DUAL-1", Airspan Networks Inc., Nov. 2015.
Bernhard Schulz, "LTE Transmission Modes and Beamforming", White Paper, Rohde & Schwarz, Jul. 2015.
Chuck Powell, "Technical Analysis: Beamforming vs. MIMO Antennas", White Paper, Radio Frequency Systems, Mar. 2014.
U.S. Appl. No. 15/679,450, filed Aug. 17, 2017; Inventor: Martin L. Zimmerman; Entitled: Small Cell Beam-Forming Antennas.

* cited by examiner

LENSED BASE STATION ANTENNAS THAT GENERATE ANTENNA BEAMS HAVING OMNIDIRECTIONAL AZIMUTH PATTERNS

CROSS-REFERENCE TO RELATED APPLICATION

The present application claims priority under 35 U.S.C. § 119 to U.S. Provisional Patent Application Ser. No. 62/626,818, filed Feb. 6, 2018, the entire content of which is incorporated herein by reference as if set forth in its entirety.

FIELD

The present invention relates to cellular communications systems and, more particularly, to base station antennas for cellular communications systems.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station. The base station may include baseband equipment, radios and antennas that are configured to provide two-way radio frequency ("RF") communications with fixed and mobile subscribers ("users") that are positioned throughout the cell. The antennas are often mounted on a tower, with the radiation beam ("antenna beam") that is generated by each antenna directed outwardly. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed frequency spectrum that has a smaller range than a typical "macro cell" base station. A small cell base station may be designed to serve users who are within a small geographic region (e.g., an area having a radius of tens or hundreds of meters). Small cells may be used, for example, to provide cellular coverage to high traffic areas within a macro cell, which allows the macro cell base station to offload much or all of the traffic in the vicinity of the small cell base station. Small cell base stations typically employ an antenna that provides full 360 degree coverage in the azimuth plane and a suitable beamwidth in the elevation plane to cover the designed area of the small cell.

FIG. 1A is a schematic diagram of a conventional small cell base station 10. As shown in FIG. 1A, the base station 10 includes an antenna 20 that may be mounted on a raised structure 30. The antenna 20 may be designed to have an omnidirectional antenna pattern in the azimuth plane for at least some of the frequency bands served by the base station antenna, meaning that at least one antenna beam generated by the antenna 20 may extend through a full 360 degree circle in the azimuth plane.

As is further shown in FIG. 1A, the small cell base station 10 also includes base station equipment such as baseband units 40 and radios 42. A single baseband unit 40 and a single radio 42 are shown in FIG. 1A to simplify the drawing, but it will be appreciated that more than one baseband unit 40 and/or radio 42 may be provided. Additionally, while the radio 42 is shown as being co-located with the baseband unit 40 at the bottom of the antenna tower 30, it will be appreciated that in other cases the radio 42 may be a remote radio head that is mounted on the antenna tower 30 adjacent the antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. The base station 10 of FIG. 1A will typically include various other equipment (not shown) such as, for example, a power supply, back-up batteries, a power bus and the like.

FIG. 1B is a composite of several views of an antenna beam 60 having an omnidirectional pattern in the azimuth plane that may be generated by the antenna 20. FIG. 1B includes a perspective three-dimensional view of the antenna beam 60 (labelled "3D pattern") as well as plots of the azimuth and elevation patterns thereof. The azimuth pattern is generated by taking a horizontal cross-section through the middle of the three dimensional antenna beam 60, and the elevation pattern is generated by taking a vertical cross-section through the middle of the three dimensional beam 60. As can be seen, the antenna beam 60 extends through a full 360 degrees in the azimuth plane, and the antenna beam 60 may have a nearly constant gain in all directions in the azimuth plane. In the elevation plane, the antenna beam 60 has a high gain at elevation angles close to the horizon (e.g., elevation angles between −10° and 10°), but the gain drops off dramatically at larger elevation angles above and below the horizon. The antenna beam 60 thus is omnidirectional in the azimuth plane and directional in the elevation plane.

SUMMARY

Pursuant to embodiments of the present invention, base station antennas are provided that include a reflector having a plurality of pairs of opposed faces, a connector port, a plurality of radiating elements mounted to extend outwardly from the respective faces of the reflector, where each of the radiating elements is coupled to the connector port, and a plurality of RF lenses, where each RF lens is mounted outwardly of a respective one of the radiating elements and associated with the respective radiating element. In these antennas, the number of radiating elements coupled to the connector port is equal to the number of faces on the reflector.

In some embodiments, each RF lens may be configured to re-direct a first portion of an RF signal emitted by its associated radiating element downwardly that exceeds a second portion of the RF signal emitted by its associated radiating element that is redirected upwardly.

In some embodiments, each RF lens may be configured to focus at least a portion of the RF energy emitted by its associated radiating element in an elevation plane when the base station antenna is mounted for use. In some embodiments, each RF lens may be configured to defocus at least a portion of the RF energy emitted by its associated radiating element in an azimuth plane when the base station antenna is mounted for use. In some embodiments, each RF lens may be configured to at least partially focus the RF energy emitted by its associated radiating element in an elevation plane while at least partially defocusing the RF energy emitted by its associated radiating element in an azimuth plane when the base station antenna is mounted for use.

In some embodiments, each radiating element may be configured to transmit and receive signals in at least the 5.15-5.25 GHz frequency band.

In some embodiments, the radiating elements are configured to generate an antenna beam having a quasi-omnidirectional cross-section in the azimuth plane.

In some embodiments, a horizontal plane that bisects a first of the radiating elements may divide the RF lens associated with the first of the radiating elements into upper and lower portions, and the lower portion may have a greater volume than the upper portion.

In some embodiments, an inner (rear) surface of a horizontal cross-section of a first of the RF lenses may have a generally concave shape. In some embodiments, an outer surface of a vertical cross-section of a first of the RF lenses may have a generally convex shape. In some embodiments, an outer surface of a vertical cross-section of a first of the RF lenses may have a generally convex shape.

In some embodiments, a central portion of a first of the RF lens may include a plurality of holes. In some embodiments, at least some of the holes may not extend all the way through each RF lens. In some embodiments, a depth of a first of the holes may be greater than a depth of a second of the holes. In some embodiments, an area of a vertical cross-section taken along a longitudinal axis of a first of the holes may be greater than an area of a vertical cross-section taken along a longitudinal axis of a second of the holes. In some embodiments, the plurality of holes may define a hole-filled region in each of the RF lenses, and the hole filled region may extend vertically through a central portion of each of the RF lenses.

Pursuant to further embodiments of the present invention, base station antennas are provided that include a reflector having a plurality of faces, a plurality of radiating elements mounted to extend outwardly from respective faces of the reflector, and a plurality of RF lenses, each RF lens mounted outwardly of a respective one of the radiating elements. An inner surface of each RF lens has a generally concave cross-section in the azimuth plane and an outer surface of each RF lens has a generally convex cross-section in the elevation plane, and each radiating element has a different boresight pointing direction in the azimuth plane.

In some embodiments, each RF lens may be configured to re-direct a first portion of an RF signal emitted by its associated radiating element downwardly that exceeds a second portion of the RF signal emitted by its associated radiating element that is redirected upwardly.

In some embodiments, each RF lens may be configured to at least partially focus the RF energy emitted by its associated radiating element in an elevation plane while at least partially defocusing the RF energy emitted by its associated radiating element in an azimuth plane when the base station antenna is mounted for use.

In some embodiments, the plurality of radiating elements may be configured to generate an antenna beam having a quasi-omnidirectional cross-section in the azimuth plane.

In some embodiments, each radiating element may be mounted behind an upper portion of its associated RF lens.

In some embodiments, a central portion of each RF lens may include a plurality of holes.

Pursuant to still further embodiments of the present invention, base station antennas are provided that include a reflector having first and second opposed faces, first and second radiating elements that are mounted to extend outwardly from the respective first and second faces, and first and second RF lenses that are mounted outwardly of the respective first and second radiating elements. A maximum width of the first RF lens in the azimuth plane is at least 1.5 times a maximum width of the first radiating element in the azimuth plane and a maximum height of the first RF lens in the elevation plane is at least 1.5 times a maximum height of the first radiating element in the elevation plane.

In some embodiments, the maximum width of the first RF lens in the azimuth plane may be at least twice the maximum width of the first radiating element in the azimuth plane and the maximum height of the first RF lens in the elevation plane may be at least twice the maximum height of the first radiating element in the elevation plane.

In some embodiments, the first RF lens may be configured to at least partially focus the RF energy emitted by the first radiating element in an elevation plane while at least partially defocusing the RF energy emitted by the first radiating element in an azimuth plane when the base station antenna is mounted for use.

In some embodiments, a horizontal plane that bisects the first radiating element may divide the first RF lens into upper and lower portions, and the lower portion may include more lens material than the upper portion.

In some embodiments, an outer surface of a vertical cross-section of the first RF lens may have a generally convex shape.

In some embodiments, an inner surface of a horizontal cross-section of the first RF lens may have a generally concave shape.

DETAILED DESCRIPTION

Figure 1A:
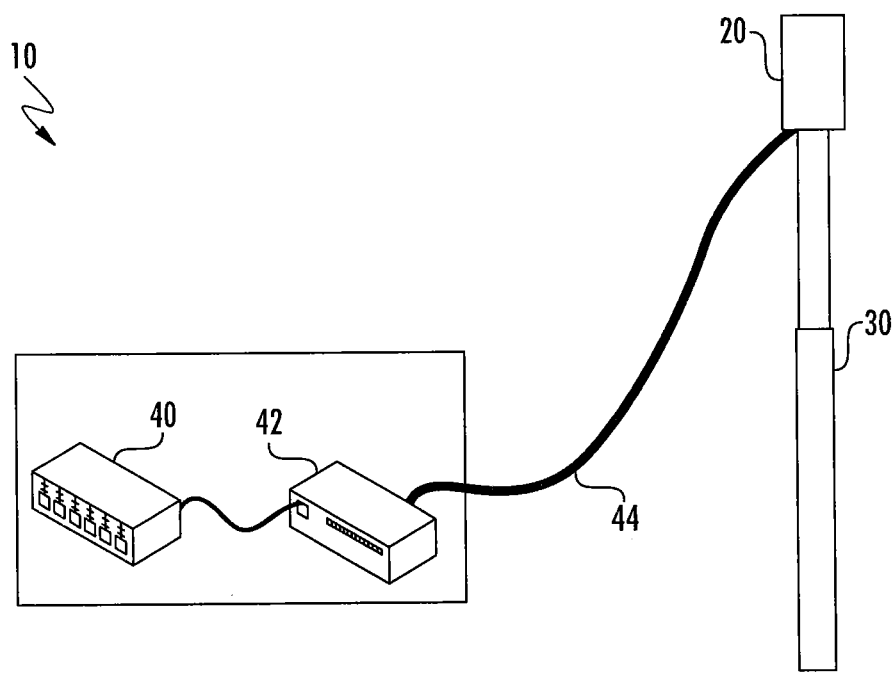
FIG. 1A is a simplified schematic diagram illustrating a conventional small cell cellular base station.
Figure 1B:
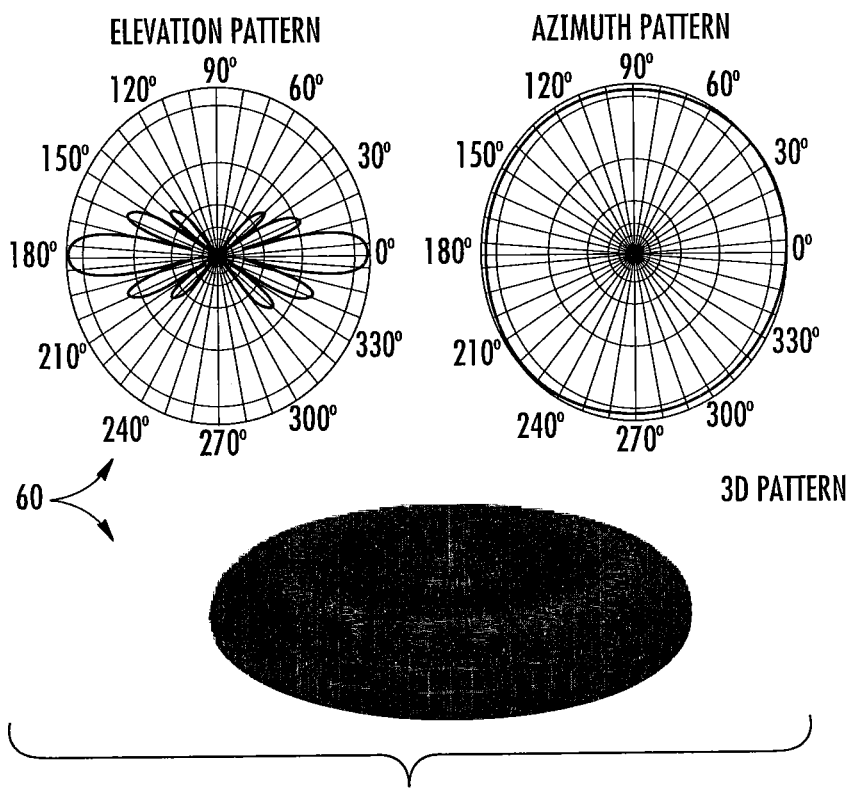
FIG. 1B provides several views of an antenna beam that may be generated by the antenna of the conventional small cell base station of FIG. 1A.

As capacity requirements continue to increase, cellular operators are deploying base stations that operate in Long Term Evolution Licensed Assisted Access (LTE-LAA) mode. In one version of LTE-LAA, the Unlicensed National Information Infrastructure ("UNII") frequency band is used. The UNIT frequency band refers to a portion of the radio frequency spectra used by IEEE 802.11a devices for "WiFi" communications. Originally, the UNII frequency band was limited to indoor applications in the United States, but the United States Federal Communication Commission ("FCC") changed the rules in 2014 to allow outdoor usage. The UNIT frequency band includes four sub-bands that are referred to as UNII-1 through UNII-4. The UNII-1 frequency band is in the 5.15-5.25 GHz frequency band. Under LTE-LAA, the UNII-1 unlicensed frequency band may be used in combination with licensed spectrum to deliver higher data rates for subscribers. The LTE-LAA functionality is typically implemented with indoor and outdoor small cell base stations. By distributing traffic between the licensed and unlicensed bands, LTE-LAA frees up capacity in the licensed spectrum, benefiting users on those frequency bands, as well as providing high data rate communications to other users using unlicensed spectrum. LTE-LAA may be implemented by adding a 5 GHz radio to a conventional base station and by adding one or more "5 GHz" linear arrays to the conventional base station antenna. The 5 GHz linear arrays may be designed to transmit and receive signals in some or all of the four UNII sub-bands. Each 5 GHz linear array may include at least one 5 GHz radiating element.

While LTE-LAA can enhance performance, guidelines promulgated by the FCC place restrictions on wireless communications in the UNII-1 (5.15-5.25 GHz) frequency band to reduce or prevent interference with satellite communications that operate in similar frequency ranges. In particular, for all elevation angles greater than 30° above the horizon, the effective isotropic radiated power ("EIRP") must be less than or equal to 125 mW. For a system designed to supply a signal having a maximum power of 0.5 Watts (for two ports) to an antenna array for transmission, this corresponds to the following two specific restrictions:
1. Gain of the array <6 dBi; and
2. All energy radiated at angles of 30 degrees or more above the horizon must be suppressed by the gain of the array+6 dB.

These requirements may be difficult to meet, since the first requirement generally requires a low directivity antenna pattern, while the second requirement requires a higher directivity pattern in order to reduce the width of the main lobe of the antenna beam in the elevation plane and to reduce the magnitude of the upper sidelobes with respect to the main lobe. In particular, both the upper sidelobes of the antenna pattern as well as the upper edge of the main lobe, if the main lobe is wide, can potentially violate the second requirement. Both the magnitude of the upper sidelobes as well as the width of the main lobe may be reduced by increasing the directivity of the beam, which can be achieved by adding additional 5 GHz radiating elements to the linear array(s). However, if the directivity of the beam is increased sufficiently to comply with the second requirement, the gain may surpass 6 dBi and hence run afoul of the first requirement.

Various approaches for complying with the above-described requirements for the UNII-1 frequency band are set forth in U.S. Provisional Patent Application Ser. No. 62/565,284, filed on Sep. 29, 2017 ("the '284 application") and U.S. Provisional Patent Application Ser. No. 62/593,425, filed on Dec. 1, 2017 ("the '425 application"), the entirety of each of which is incorporated herein by reference as if set forth in its entirety.

In various of the approaches described in the '284 and '425 applications, small RF lenses are mounted in front of (i.e., outwardly of) each radiating element of the 5 GHz linear arrays. The RF lenses may be configured to focus the RF energy in the elevation plane in order to narrow the width of the antenna beam generated by the 5 GHz linear arrays so that the main lobe of the antenna beam does not violate the second of the above-described requirements for the UNII-1 frequency band (namely suppressing RF energy radiated at angles of 30 degrees or more above the horizon). The RF lenses may be configured to not only focus the RF energy, but also to redirect at least some of the RF energy that is radiated at angles of 30 degrees or more above the horizon downwardly. Both aspects of the RF lenses may facilitate ensuring the secondary lobes of the antenna beam comply with the UNII-1 requirements.

Figure 2A:
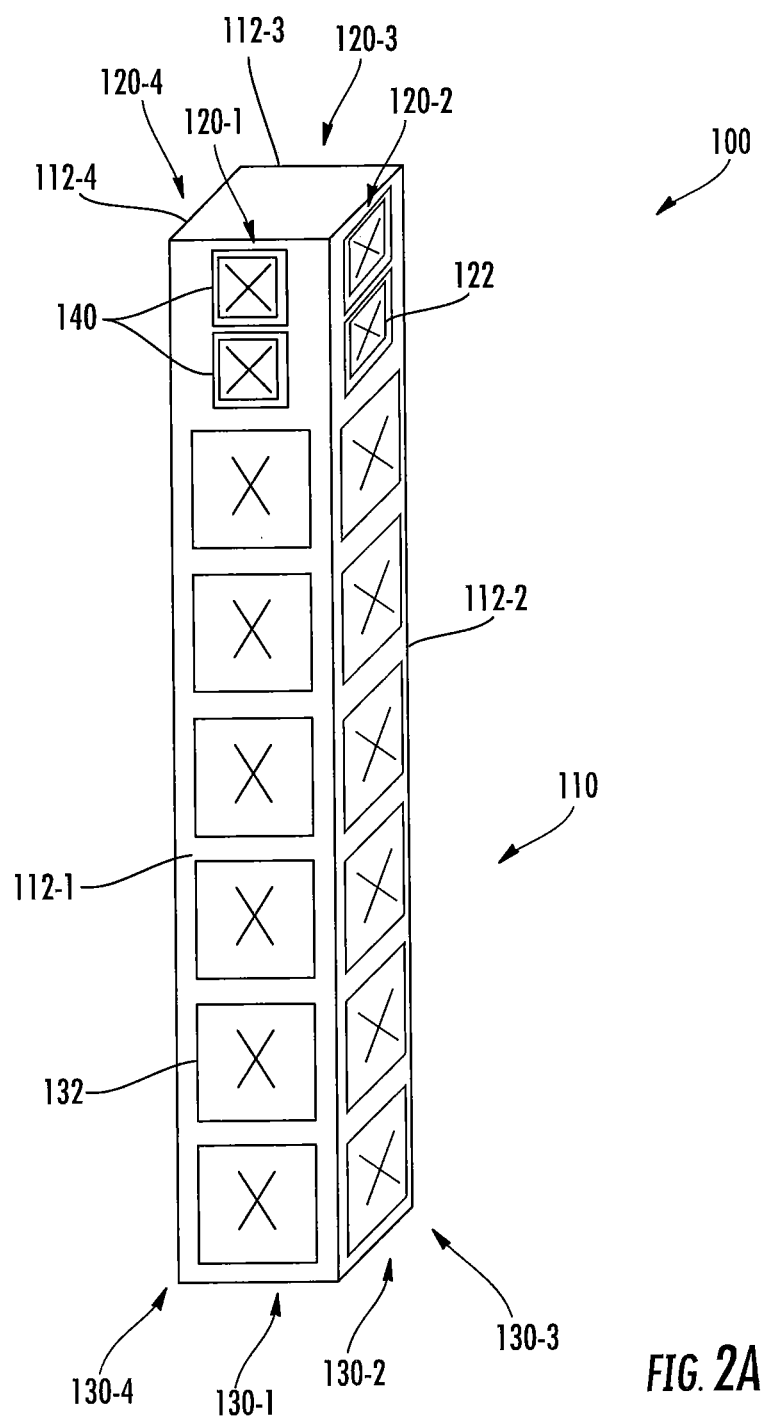
FIG. 2A is a highly simplified schematic perspective diagram illustrating the reflector assembly and radiating elements of a base station antenna that uses RF lenses to redirect some of the emitted radiation downwardly.
Figure 2B:
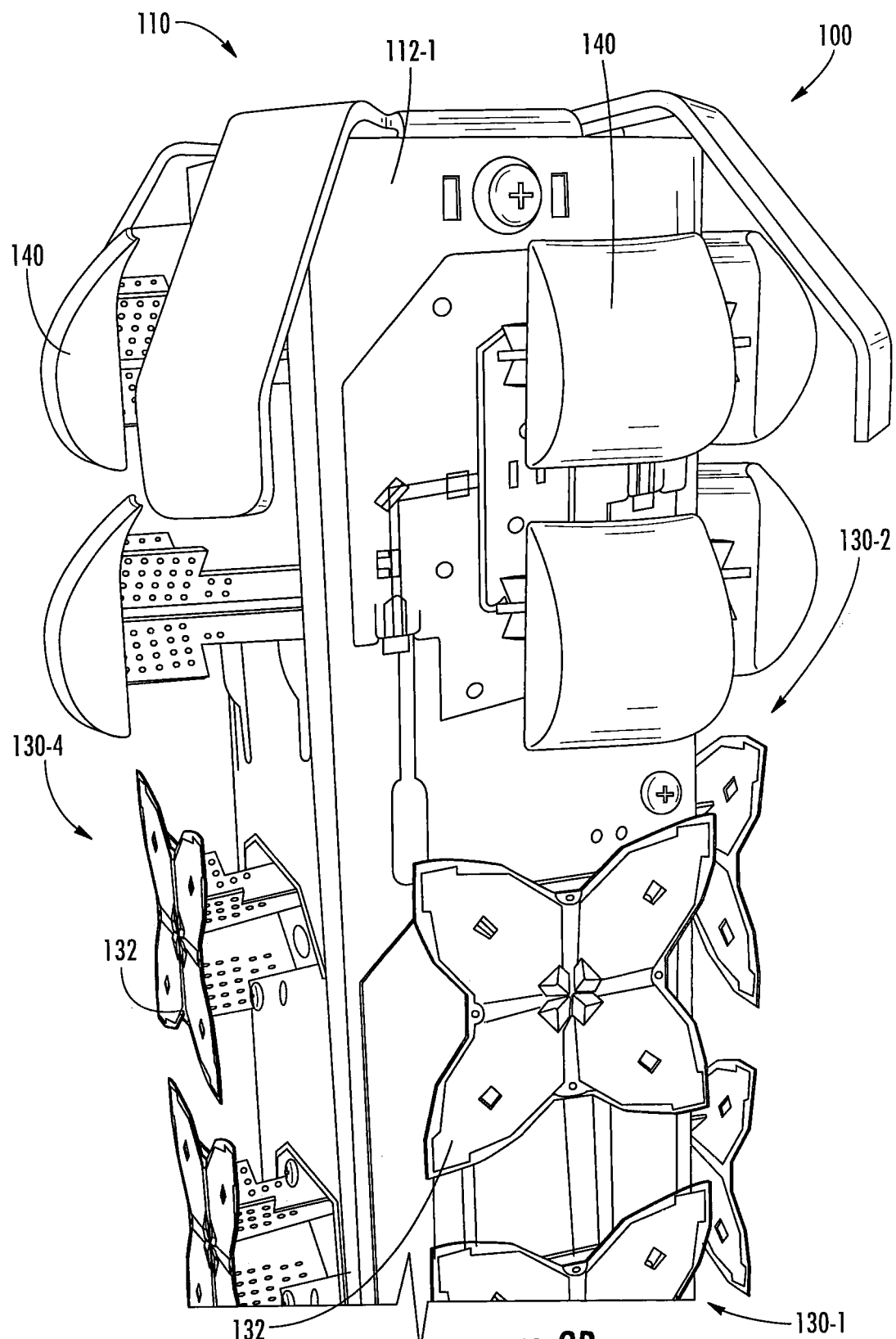
FIG. 2B is a perspective view of a physical implementation of the base station antenna of FIG. 2A with the radome removed.
Figure 2C:
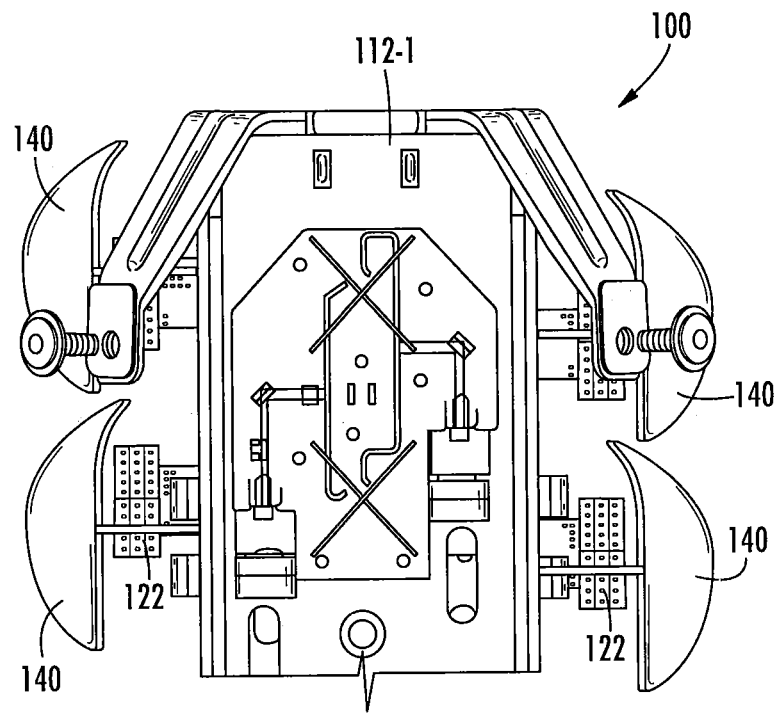
FIG. 2C is a side view of the base station antenna of FIG. 2A with the radome removed.
Figure 2D:
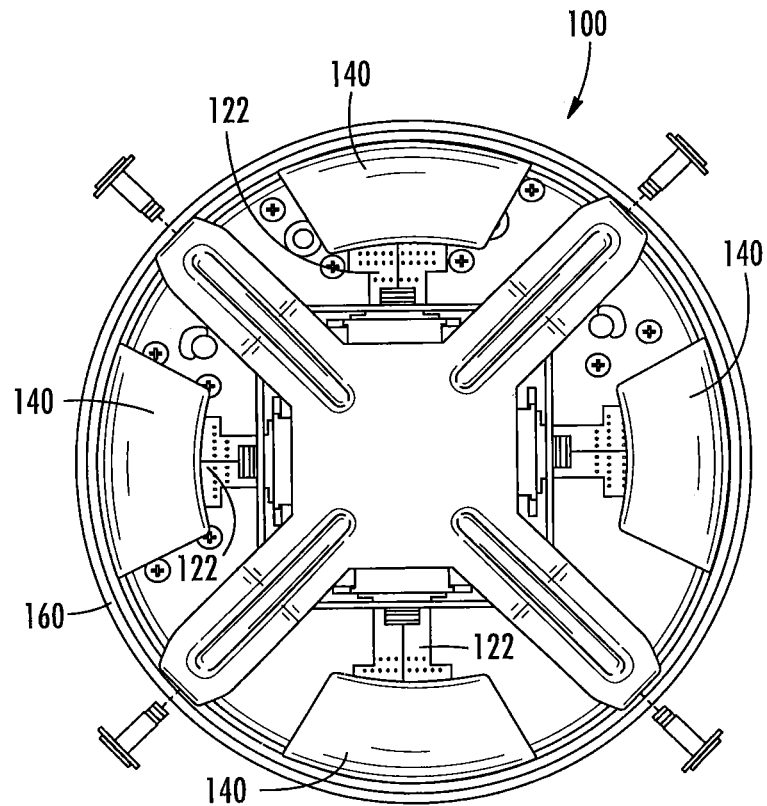
FIG. 2D is a top view of the base station antenna of FIG. 2A.

FIGS. 2A-2D illustrate a base station antenna 100 that is disclosed in the '284 and '425 applications that uses RF lenses to reduce the amount of upwardly-directed radiation in order to facilitate complying with the requirements for the UNII-1 frequency band. In particular, FIG. 2A is a schematic perspective diagram of the reflector assembly and radiating elements of the base station antenna 100, FIG. 2B is a partial perspective view of a physical implementation of the antenna 100 with the radome removed, FIG. 2C is a side view of an upper portion of the base station antenna 100 with the radome removed, and FIG. 2D is a top view of the base station antenna 100 with the top portion of the radome omitted.

As shown in FIGS. 2A-2D, the base station antenna 100 includes a rectangular tubular reflector assembly 110 that has four linear arrays 120-1 through 120-4 of radiating elements 122 and four linear arrays 130-1 through 130-4 of radiating elements 132 mounted thereon. Each linear array 120, 130 is oriented vertically with respect to the horizon when the base station antenna 100 is mounted for use. Each face of the reflector assembly 110 may comprise a backplane 112-1 through 112-4 that may act as both a reflector and a ground plane for the radiating elements 122, 132 mounted thereon. Each backplane 112 includes a respective one of the linear arrays 120 and a respective one of the linear arrays 130 that are stacked vertically. A radome 160 (see FIG. 2D)

surrounds and protects the radiating elements 122, 132 and other components of the antenna 100. It should be noted that herein, when multiple like or similar elements are provided, they may be labelled in the drawings using a two-part reference numeral (e.g., backplane 112-2). Such elements may be referred to herein individually by their full reference numeral (e.g., backplane 112-2) and may be referred to collectively by the first part of their reference numeral (e.g., the backplanes 112).

The linear arrays 120 of radiating elements 122 may be configured to operate in the 5 GHz frequency band (specifically including the UNII-1 frequency band). In the depicted embodiment, each 5 GHz linear array 120 includes two 5 GHz radiating elements 122, and each 5 GHz radiating element 122 is implemented as a cross-dipole radiating element that includes a pair of 5 GHz dipole radiators that are arranged orthogonally to each other at angles −45° and the +45° with respect to the longitudinal (vertical) axis of the antenna 100. Moreover, as is discussed in the '284 and '425 applications, the radiating elements 122 may alternatively be implemented as dual-band radiating elements 122 that transmit signals at both 5 GHz and at 3.5 GHz. When such 3.5/5 GHz radiating elements 122 are used, the base station antenna 100 may operate in at least two separate frequency bands, namely a 3.5 GHz band and a 5 GHz band The linear arrays 130 of radiating elements 132 are configured to operate in conventional cellular frequency bands such as, for example, all or part of the 1.7-2.7 GHz frequency band (which is referred to herein as the "2 GHz" frequency band). In the depicted embodiment, each 2 GHz linear array 130 includes a total of six 2 GHz radiating elements 132, and each 2 GHz radiating element 132 is implemented as a cross-dipole radiating element that includes a pair of dipole radiators.

As discussed above, the FCC requirements for the UNII-1 frequency band place limits on the amount of RF radiation that may be emitted at elevation angles greater than 30°. In order to reduce the amount of RF radiation emitted at these higher elevation angles, an RF lens 140 is positioned forwardly of each 5 GHz radiating element 122. The RF lenses 140 are depicted schematically as squares in FIG. 2A, but an example design for the RF lenses is shown in FIGS. 2B-2D. Each RF lens 140 may be designed to steer or "re-direct" a portion of the RF energy incident thereupon downwardly. The RF lenses 140 may be formed of any suitable dielectric material that steers RF energy.

Figure 3:
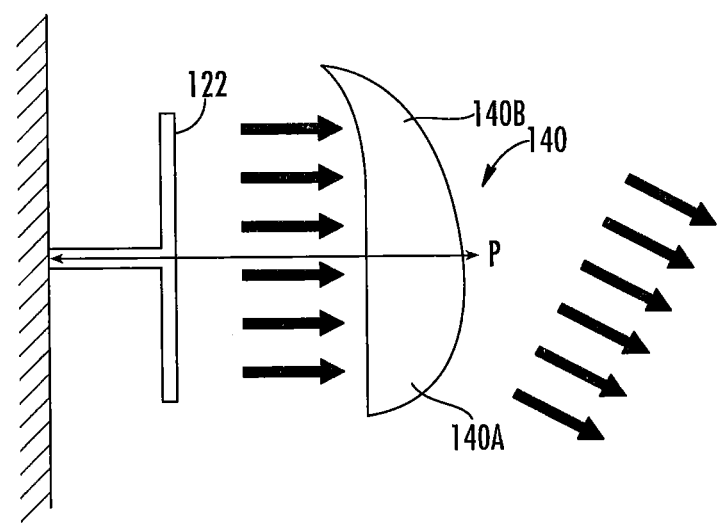
FIG. 3 is a schematic diagram explaining the basic operation of the RF lenses included in the base station antenna of FIGS. 2A-2D.

FIG. 3 is a schematic diagram explaining the basic operation of the RF lenses 140 included in the base station antenna of FIGS. 2A-2D. As shown in FIG. 3, each lens 140 may be placed outwardly of a respective one of the 5 GHz radiating elements 122. According to Snell's Law, radio waves are bent at the interface of two materials having different dielectric constants. By placing the RF lens 140 formed of dielectric material outwardly of the 5 GHz radiating element 122, an air/lens dielectric boundary is formed that bends the radio waves emitted by the 5 GHz radiating element 122. The RF lens 140 may have a generally convex shape (the RF lens 140 has a generally planoconvex shape in FIG. 3) that acts to focus the RF energy that is transmitted by the 5 GHz radiating element 122 therethrough.

As is also shown in FIG. 3, each RF lens 140 may have an asymmetric shape along a horizontal plane P that extends through (and bisects) the 5 GHz radiating element 122 and the RF lens 140 when the base station antenna 100 is mounted for use. As a result, a first portion 140A of the RF lens 140 is below the horizontal plane P and a second portion 140B of the RF lens 140 is above the horizontal axis H. As shown in FIG. 3, the upper portion 140B of the RF lens 140 has a decreased thickness in a lateral direction (along horizontal plane P) as compared to a lower portion 140A of the RF lens 140. As a result of this decreased thickness, the RF radiation passing through the RF lens 140 may be directed downwardly. Thus, the RF lenses 140 may both focus the RF radiation and steer a portion of the RF radiation downwardly, thereby reducing the amount of RF energy emitted in the direction of higher elevation angles such as elevation angles greater than 30°.

Figure 4A:
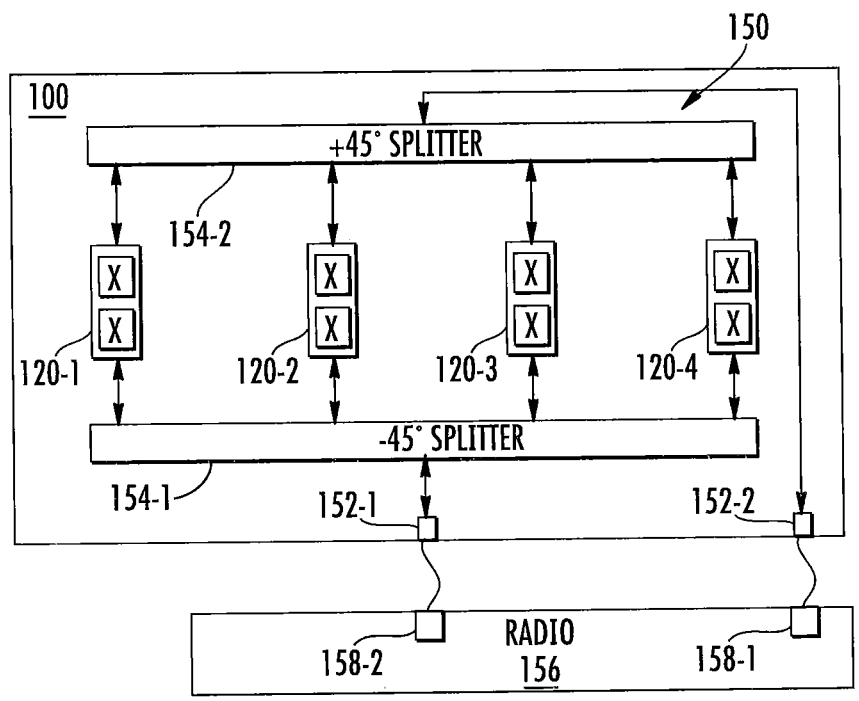
FIG. 4A is a block diagram illustrating a feed network for the 5 GHz linear arrays of the base station antenna of FIGS. 2A-2D.

FIG. 4A is a block diagram illustrating a feed network 150 for the 5 GHz linear arrays 120 of the base station antenna 100. The feed network 150 includes two antenna ports 152. As shown in FIG. 4A, the base station antenna 100 may be fed by a 5 GHz radio 156 that has two ports 158-1 and 158-2. Duplexing of the transmit and receive channels is performed internal to the 5 GHz radio 156, so each port 158 on the 5 GHz radio 156 passes both transmitted and received RF signals. Each port 158 on the 5 GHz radio 156 may be connected to a respective one of the ports 152 on the base station antenna 100 via a respective coaxial cable.

As shown in FIG. 4A, the feed network 150 couples each port 158 of the 5 GHz radio 156 to all four linear arrays 120-1 through 120-4. One port 158-1 delivers signals having a −45° polarization to the linear arrays 120 while the other port 158-2 delivers signals having a +45° polarization to the linear arrays 120. In each case, the four linear arrays 120 may together generate an antenna beam having a quasi-omnidirectional pattern in the azimuth plane. The feed network includes a pair of 4×1 splitter/combiners 154-1 and 154-2 that split the RF signals four ways to feed the four linear arrays 120.

Figure 4B:
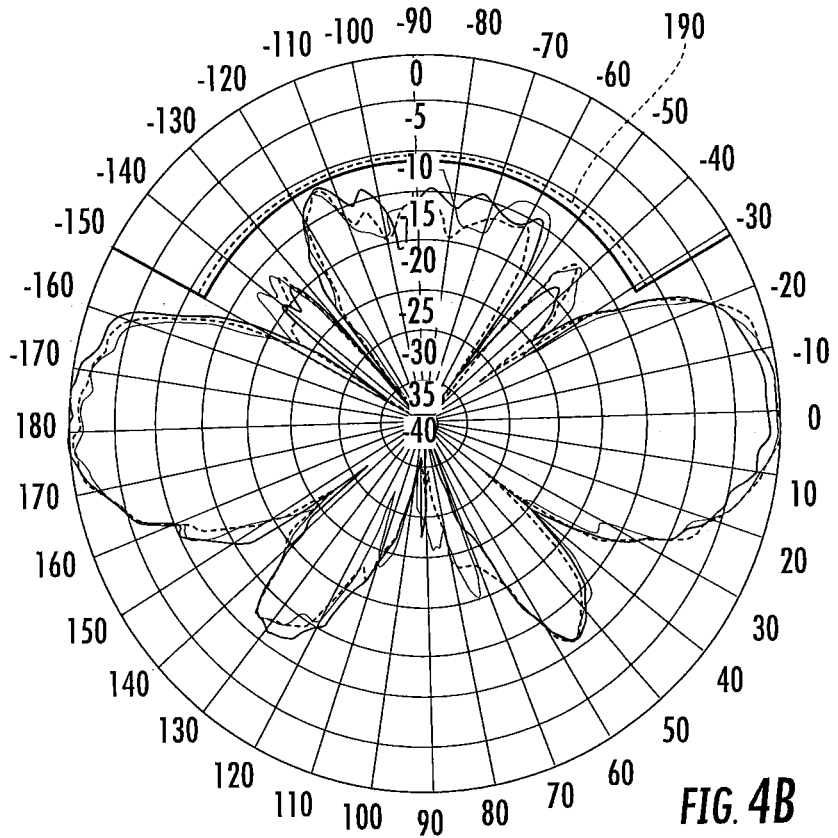
FIG. 4B is a graph showing the 5 GHz elevation patterns for the base station antenna of FIGS. 2A-2D.

FIG. 4B is a graph showing the 5 GHz elevation patterns for the base station antenna 100 at various frequencies within the UNII-1 frequency band. In FIG. 4B, curve 190 plots the FCC requirements for the UNII-1 frequency band with respect to the illustrated elevation patterns. As can be seen in FIG. 4B, the elevation patterns mostly fit within the envelope of curve 190, indicating general compliance with the UNII-1 requirements. However, at some frequencies the UNII-1 requirements are barely met, and when manufacturing variation, mounting variation and other factors are taken into consideration the base station antenna 100 may not in practice consistently meet the UNII-1 requirements. Accordingly, insertion losses may be deliberately built into the antenna 100 (e.g., by using longer cables or intentionally shunting some RF energy to a resistive termination) in order to ensure consistent compliance with the UNII-1 requirements.

Figure 5A:
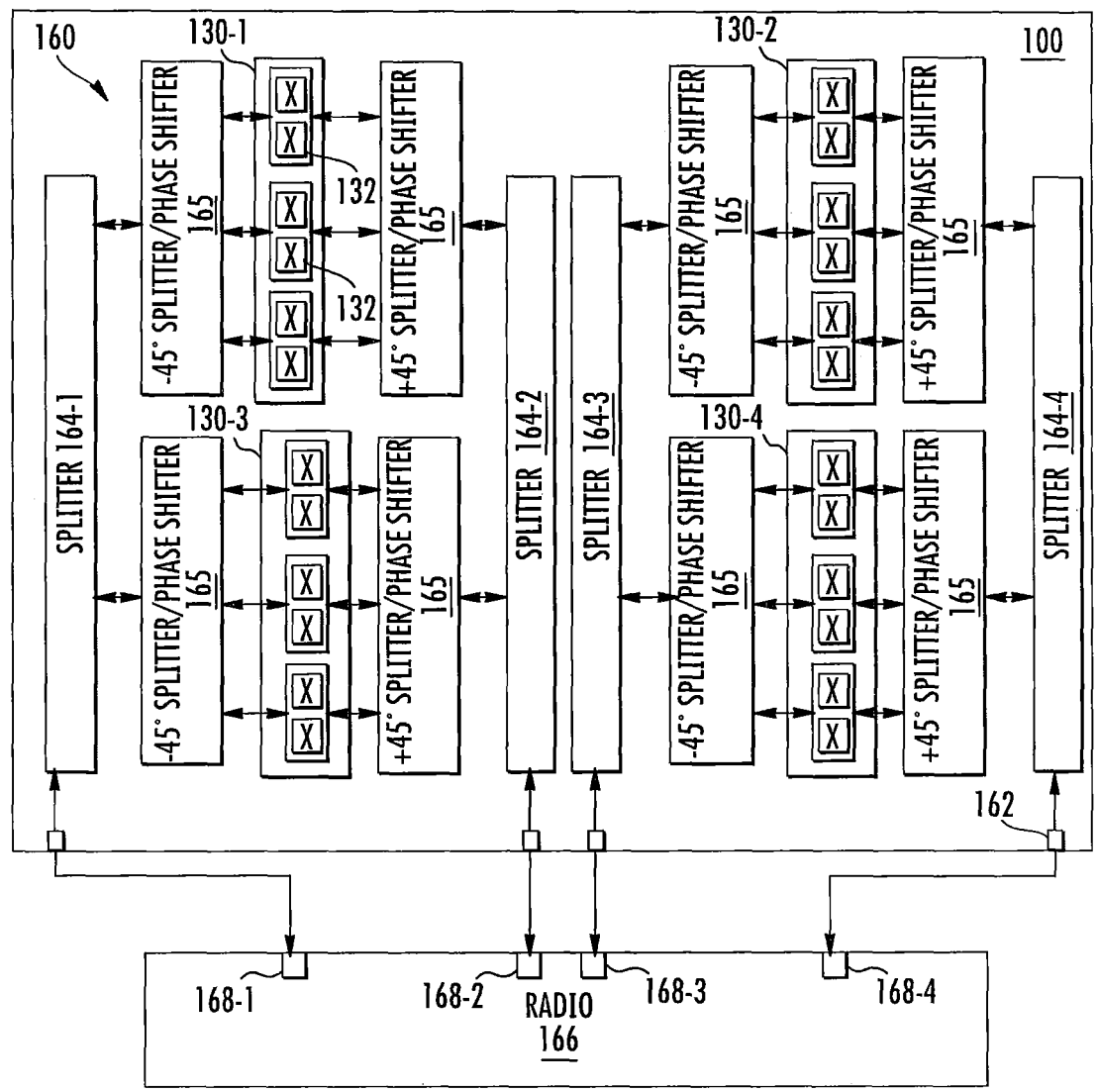
FIG. 5A is a block diagram illustrating a feed network for the 2 GHz linear arrays of the base station antenna of FIGS. 2A-2D.

FIG. 5A illustrates a feed network 160 that may be used to pass RF signals between a 2 GHz base station radio 166 (e.g., a radio transmitting signals in some or all of the 2 GHz frequency band) and the 2 GHz radiating elements 132 of the linear arrays 130. As shown in FIG. 5A, the 2 GHz radio 166 is a four port device having ports 168-1 through 168-4. Duplexing of the transmit and receive channels is performed internal to the 2 GHz radio 166, so each port 168 passes both transmitted and received RF signals. Four connector ports 162 may be provided on base station antenna 100 and coaxial cables may connect each port 168 on the 2 GHz radio 166 to a respective one of these RF connector ports 162.

As shown in FIG. 5A the first port 168-1 of radio 166 is coupled to the radiators of the radiating elements 132 of linear arrays 130-1, 130-3 that are arranged to transmit/receive signals having a −45° polarization via a first 1×2 power splitter/combiner 164-1, and the second port 168-2 of radio 166 is coupled to the radiators of the radiating elements 132 of linear arrays 130-1, 130-3 that are arranged to transmit/receive signals having a +45° polarization via a second 1×2 power splitter/combiner 164-2. Likewise, the third port 168-3 of radio 166 is coupled to the radiators of the radiating elements 132 of linear arrays 130-2, 130-4 that are arranged to transmit/receive signals having a −45° polarization via a third power splitter/combiner 164-3, and the fourth port 168-4 of radio 166 is coupled to the radiators of the radiating elements 132 of linear arrays 130-2, 130-4 that are arranged to transmit/receive signals having a +45° polarization via a fourth splitter/combiner 164-4. Each splitter/combiner 164 splits RF signals received from a radio port 168 into sub-components that are fed to respective splitter/combiner phase shifters 165 that are connected to the linear arrays 130. Each splitter/combiner phase shifter 165 may split the RF signals input thereto three ways and may apply a phase taper across the three sub-components of the RF signal to, for example, apply an electronic downtilt to the antenna beam that is formed when the sub-components of the RF signal are transmitted (or received) through the respective linear arrays 130. The radio 166 may thus transmit four 2 GHz RF signals through the base station antenna 100 to generate four different 2 GHz antenna beams (namely two different beams at each of two polarizations).

Figure 5B:
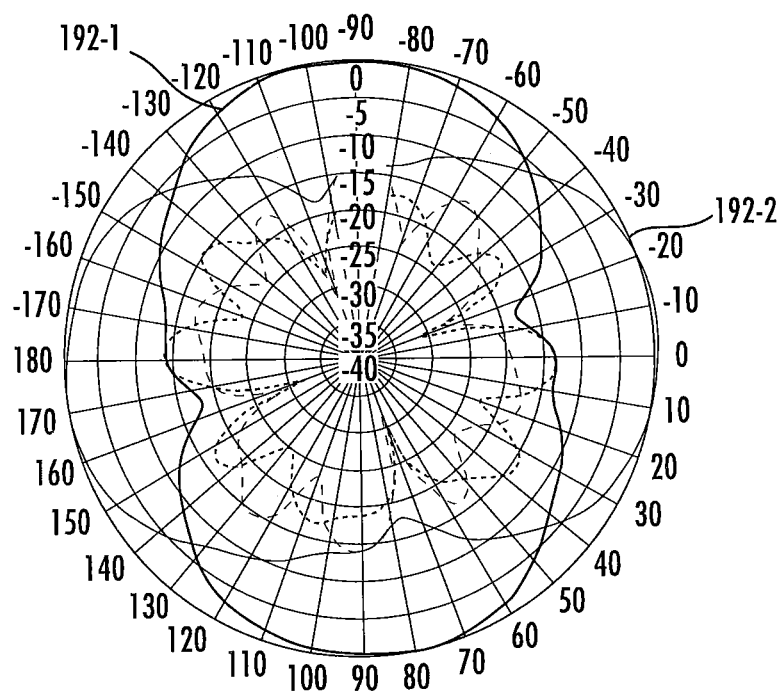
FIGS. 5B and 5C are graphs showing the 2 GHz azimuth and elevation patterns, respectively, for the base station antenna of FIGS. 2A-2D.
Figure 5C:
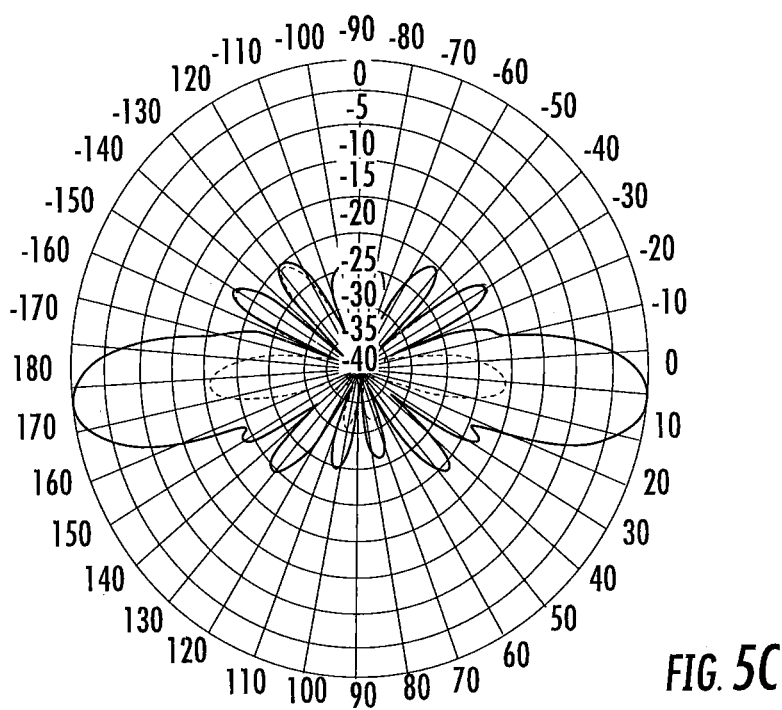

FIG. 5B illustrates the azimuth pattern for the −45° polarization antenna beams generated by the 2 GHz linear arrays 130. As shown in FIG. 5B, the first and third linear arrays 130-1, 130-3 may together form a first 2 GHz antenna beam 192-1 that has a peanut-shaped cross-section in the azimuth plane. Likewise, the second and fourth linear arrays 130-1, 130-3 may together form a second 2 GHz antenna beam 192-2 that has a peanut-shaped cross-section in the azimuth plane. Together, the antenna beams 192-1, 192-2 may provide omnidirectional coverage in the azimuth plane. The +45° polarization antenna beams may be identical to what is shown in FIG. 5B. FIG. 5C illustrates the simulated antenna pattern in the elevation azimuth plane for each 2 GHz antenna beam.

The base station antenna 100 may provide good performance. However, including two 5 GHz radiating elements 122 in each linear array 120 increases the cost of the antenna 100 and also results in space constraints. The two 5 GHz radiating elements 122 of each linear array 120 may be mounted on a common feedboard (not shown) and each such feedboard may further include a respective 2×1 feedboard splitter/combiner that divides the 5 GHz transmit signals two ways to provide respective sub-components thereof to each 5 GHz radiating element 122. The 4×1 splitter/combiners 154-1 and 154-2 may be implemented on a separate printed circuit board. However, because of the relatively compact size of the antenna 100, there may be little excess room on the reflector 110 in the vicinity of the 5 GHz linear arrays for mounting a printed circuit board containing the 4×1 splitter/combiners 154. As such, it may be necessary in some embodiments to stack multiple printed circuit boards which may increase manufacturing costs and/or degrade performance.

Additionally, the provision of a total of eight 5 GHz radiating elements 122 increases the overall gain of the 5 GHz antenna beams, which may cause the antenna 100 to exceed the gain limitations specified for the UNII-1 frequency band. If this occurs, it may be necessary to build losses into the 5 GHz transmit/receive path in order to ensure compliance with the UNII-1 requirements. Finally, as can be seen in FIG. 4B, the base station antenna 100 may only barely meet the UNII-1 requirements, which means that mounting alignment errors, tolerances and the like may result in the base station antenna 100 failing the UNII-1 requirement.

Pursuant to embodiments of the present invention, base station antennas are provided that include a plurality of 5 GHz radiating elements (or 3.5/5 GHz radiating elements, as discussed above), where each 5 GHz radiating element has a different azimuth boresight pointing direction. Each radiating element may be configured to transmit and receive RF signals in at least the 5.15-5.25 GHz frequency band. Each 5 GHz radiating element may have an associated RF lens. The base station antennas according to embodiments of the present invention may provide improved performance for some applications as compared to the base station antenna 100 that is discussed above.

As described above, the base station antenna 100 included linear arrays 120 that each had two 5 GHz radiating elements 122. Thus, each of the two 5 GHz radiating elements 122 in a particular linear array 120 had the same azimuth boresight pointing direction. According to certain embodiments of the present invention, each 5 GHz linear array 120 included in the base station antenna 100 is replaced with a single 5 GHz radiating element 122 so that every 5 GHz radiating element 122 has a different azimuth boresight pointing direction. A significantly larger RF lens may be provided for each 5 GHz radiating element 122 that is used to focus the RF energy emitted by the respective radiating elements in the elevation plane, as each "linear array" only has a single 5 GHz radiating element 122. Thus, the focusing of the antenna beam in the elevation pattern that is provided by the inclusion of two vertically-stacked radiating elements in antenna 100 is accomplished in the base station antennas according to the present embodiments by use of a larger lens that provides significantly more focusing of the antenna beam in the elevation plane. In some embodiments, a maximum width of each RF lens in the azimuth plane may be at least twice a maximum width of the radiating elements in the azimuth plane, and a maximum height of each RF lens in the elevation plane is at least twice a maximum height of the radiating elements in the elevation plane. The increased focusing provided by the larger RF lens may be used to comply with the UNII-1 requirements. The elimination of half of the 5 GHz radiating elements 122 reduces the overall gain of the 5 GHz antenna which also may facilitate meeting the UNII-1 gain limitations.

In addition to focusing the RF energy in the elevation plane, each RF lens may be configured to re-direct a first portion of an RF signal emitted by its associated radiating element downwardly, where this first portion exceeds a second portion of the RF signal emitted by its associated radiating element that is redirected upwardly. This may help the antenna meet the UNII-1 gain requirements limiting the amount of upwardly directed radiation. In some embodiments, the RF lenses may be designed to only substantially impact the elevation pattern of the radiating elements. In other embodiments, the RF lenses may also be designed to, for example, both focus and/or redirect the RF radiation in the elevation plane while also defocusing the RF radiation in the azimuth plane. The defocusing of the RF radiation in the azimuth plane may, for example, fill in nulls in the azimuth pattern and/or provide an azimuth pattern with less ripple in gain as a function of the azimuth angle. The defocusing of the RF radiation may be accomplished by, for example, forming the RF lenses to have a generally concave shape along a horizontal cross-section taken through a horizontal center of a radiating element associated with the RF lens and a generally convex shape along a vertical cross-section taken through a vertical center of the associated radiating element. Herein, a "vertical cross-section" of an RF lens or a radiating element refers to a cross-section taken through the structure that is perpendicular to the plane defined by the horizon when the antenna is mounted for use and that is also perpendicular to a backplane of the antenna. Similarly, a "horizontal cross-section" of the structure refers to a cross-section taken through the structure that is taken along a plane that is parallel to the plane defined by the horizon when the antenna is mounted for use and that is also perpendicular to the backplane.

In some embodiments, the base station antennas may include a reflector having a plurality of pairs of opposed faces. For example, the reflector may comprise a tubular reflector having a rectangular, hexagonal or octagonal horizontal cross-section (i.e., a cross-section in the azimuth plane when the antenna is mounted for use) so as to have four, six or eight faces, respectively. The antenna may also have a plurality of 5 GHz radiating elements, each of which is mounted to extend forwardly from a respective one of the faces of the reflector. Each of the 5 GHz radiating elements is coupled to a connector port on the antenna, which may in turn be coupled to a port on a radio. The above-described RF lenses are mounted outwardly of the respective 5 GHz radiating elements so that each RF lens is associated with a respective one of the 5 GHz radiating elements. The number of 5 GHz radiating elements coupled to the connector port is equal to the number of faces on the reflector (since each face has a single 5 GHz radiating element). Thus, for example, if the reflector has four faces, a total of four 5 GHz radiating elements may be coupled to the connector port.

The tubular reflector assembly may also include additional linear arrays of radiating elements such as, for example, linear arrays that operate in some or all of the 2 GHz frequency band. When the antenna includes both 5 GHz radiating elements as well as separate linear arrays for lower frequency bands (e.g., 2 GHz and/or 696-960 MHZ linear arrays), the larger radiating elements in the lower frequency linear arrays may necessitate a larger diameter antenna, which means that space may already be available for use of larger RF lenses for each 5 GHz radiating element.

In some embodiments, a rear surface of each RF lens may have a generally concave cross-section in the azimuth plane and an outer surface of each RF lens may have a generally convex cross-section in the elevation plane. In some embodiments, each RF lens may include a plurality of holes. The size or depth of the holes may be varied.

In some embodiments, all of the 5 GHz radiating elements may be commonly fed from a single port of a radio and may form a single antenna beam having a quasi-omnidirectional cross-section in the azimuth plane (or may be commonly fed by two ports of the radio if the 5 GHz radiating elements are cross-polarized radiating elements so as to form two antenna beams at orthogonal polarizations). In some embodiments, the radiating elements may be designed to transmit signals at both 5 GHz and at 3.5 GHz. When such 3.5/5 GHz radiating elements are used, the base station antenna may operate in at least two separate frequency bands, namely a 3.5 GHz band and a 5 GHz band.

The base station antenna according to embodiments of the present invention may exhibit a number of advantages compared to conventional base station antenna. The base station antennas may meet the very challenging FCC requirements associated with communications in the UNII-1 frequency band that set limits on upwardly-directed RF radiation by including RF lenses that re-direct a portion of the upwardly-emitted radiation downwardly. Additionally, the RF lenses may be designed to further improve the shape of the 5 GHz (or other frequency band) antenna beam by, for example, adding some degree of downtilt and/or spreading out the antenna beam in the azimuth plane.

Example embodiments of the invention will now be discussed in more detail with reference to FIGS. 6A-11.

Figure 6A:
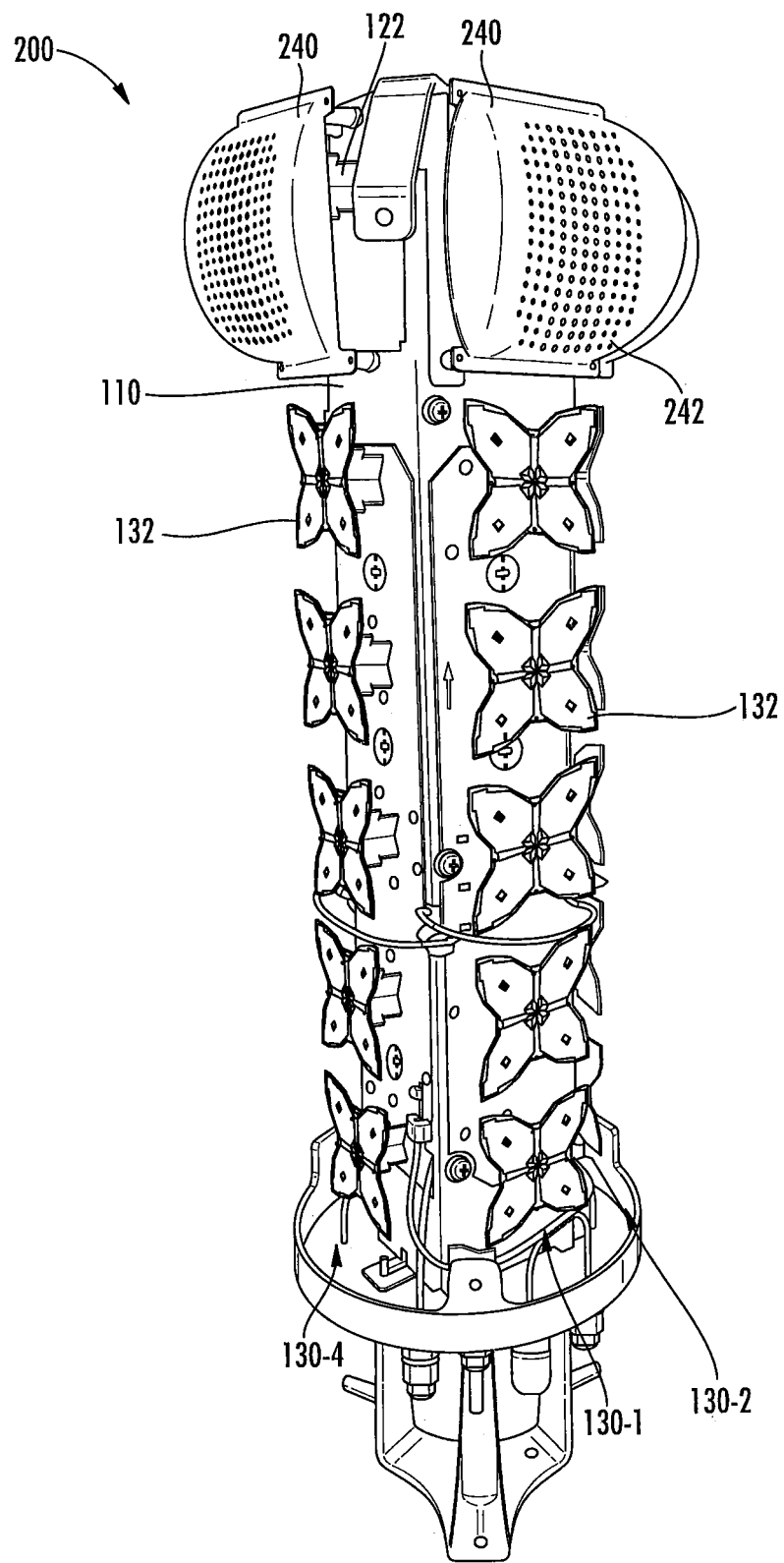
FIG. 6A is a perspective view of a base station antenna according to embodiments of the present invention.
Figure 6B:
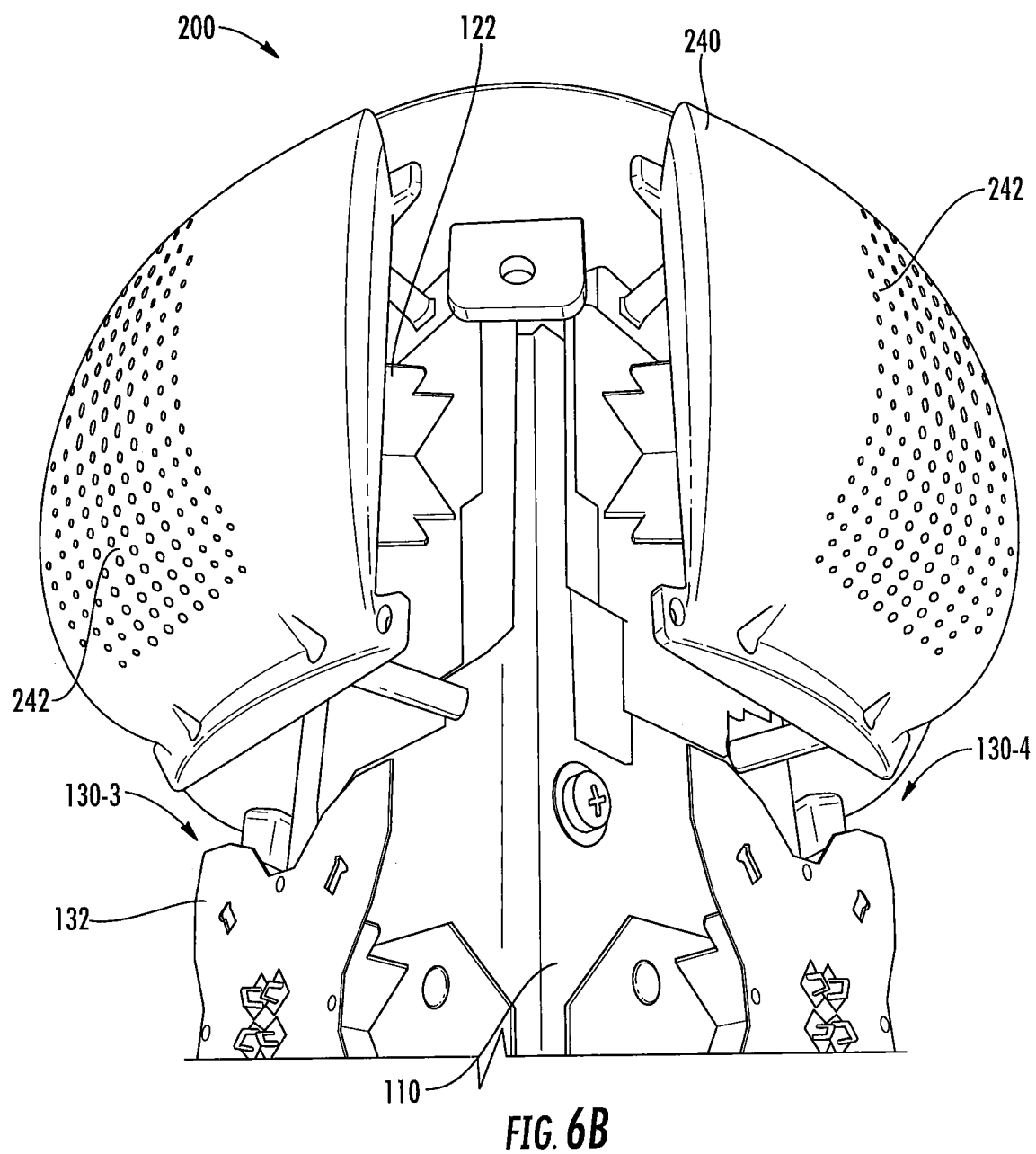
FIG. 6B is an enlarged perspective view of an upper portion of the base station antenna of FIG. 6A.
Figure 6C:
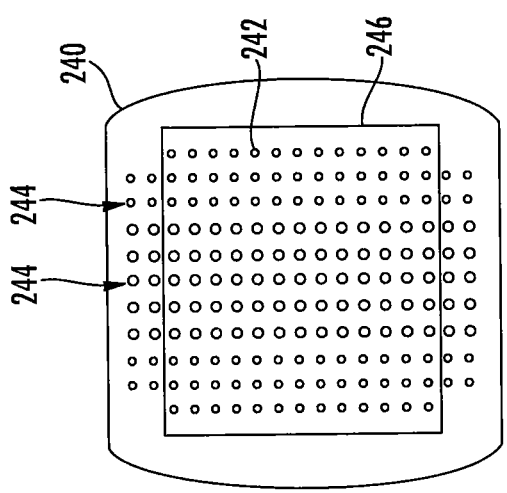
FIG. 6C is a schematic rear view of one of the RF lenses included on the base station antenna of FIG. 6A.

FIG. 6A is a perspective view of a lensed base station antenna 200 according to embodiments of the present invention. FIG. 6B is an enlarged perspective view of an upper portion of the base station antenna that more clearly shows the shape of the RF lenses included in antenna 200. FIG. 6C is a perspective view of an interior surface of one of the RF lenses.

As shown in FIGS. 6A-6B, the base station antenna 200 includes a rectangular tubular reflector assembly 110 that has four radiating elements 122 and four linear arrays 130-1 through 130-4 of 2 GHz radiating elements 132 mounted thereon (only one radiating element 122 is visible in FIGS. 6A-6B). The reflector assembly 110, the radiating elements 122 and the linear arrays 130 of 2 GHz radiating elements 132 may be identical to the like numbered elements of base station antenna 100 and hence further description thereof will be omitted. A radome (not shown) may surround and protect the radiating elements 122, 132 and other components of the antenna 200. The base station antenna 200 may also include a number of conventional components that are not depicted in FIGS. 6A-6B.

As described above, base station antenna 100 included four linear arrays 120 that each included two vertically-stacked radiating elements 122, where the radiating elements 122 could be 5 GHz radiating elements or 3.5/5 GHz radiating elements. In base station antenna 200, the lower one of the two GHz radiating elements 122 in each linear array 120 is omitted so that a single radiating element 122 is provided per backplane 112. In the description below, it will be assumed that each radiating element 122 is a 3.5/5 GHz radiating element. It will be appreciated, however, that the radiating elements 122 could instead by 5 GHz radiating elements or radiating elements that operated in some other frequency band in other embodiments.

FIGS. 7A-7D are various views illustrating an example radiating element that could be used to implement the 3.5/5 GHz radiating elements 122. As shown in FIGS. 7A-7D, the radiating element 122 may be formed using a pair of printed circuit boards 126-1, 126-2. One of the printed circuit boards 126 includes a forward central slit while the other printed circuit board 126 includes a rearward central slit that allows the two printed circuit boards 126 to be mated together so as to form an "X" shape when viewed from the front as shown best in FIG. 7D).

As is further shown in FIGS. 7A-7D, the radiating element 122 includes a pair of 3.5 GHz dipole arms 128-1, 128-2 that are directly driven through respective baluns 123. The 3.5/5 GHz cross-dipole radiating element 122 further includes 5 GHz dipole arms 124-1, 124-2 that are located forwardly of the 3.5 GHz dipole arms 128-1, 128-2. When a 3.5 GHz signal is input to a balun 123, it is fed directly to the 3.5 GHz dipole arms 128-1, 128-2. When a 5 GHz signal is input to the balun 123, the energy electromagnetically couples to the 5 GHz parasitic dipole arms 124-1, 124-2 which then resonate at 5 GHz. The 3.5 GHz dipole arms 128-1, 128-2 and the 5 GHz dipole arms 124-1, 124-2 are each arranged orthogonally to each other so that the base station antenna 200 will transmit and receive slant −45° and slant +45° signals at both 3.5 GHz and 5 GHz.

In some embodiments, the base station antenna may feed the 3.5 GHz dipole arms 128 and the 5 GHz dipole arms 124 differently. In particular, a 5 GHz signal (having, for example, a −45° polarization) may be applied to the dipole arms 124 all four 5 GHz radiating elements 122 to generate a 5 GHz antenna beam that has a quasi-omnidirectional azimuth pattern. In contrast, a first 3.5 GHz signal (having, for example, a −45° polarization) may be applied to the dipole arms 128 of two of the 5 GHz radiating elements 122 which point in opposite directions while a second 3.5 GHz signal (having the same polarization) is applied to the dipole arms 128 of the remaining two 5 GHz radiating elements 122 (which also point in opposite directions). Consequently, a pair of 3.5 GHz antenna beams are generated at each polarization, where each 3.5 GHz antenna beam has a generally peanut-shaped cross-section in the azimuth plane and the two 3.5 GHz antenna beams are rotated 90 degrees with respect to each other to provide a pair of "orthogonal peanut-shaped antenna beams."

The base station antenna 100 included a plurality of small RF lenses 140 that were mounted outwardly of each of the 3.5/5 GHz radiating elements 122. As described above, these RF lenses 140 were used to focus and/or redirect a portion of the upwardly directed radiation so that the antenna 100 would comply with the FCC limits on the amount of radiation that may be emitted at elevation angles of greater than 30° in the UNII-1 frequency band. In the base station antenna 200, the small RF lenses 140 are replaced with larger RF lenses 240. Each RF lens 240 substantially surrounds a respective one of the radiating elements 122. This may allow each RF lens 240 to receive the vast majority of the radiation emitted by its associated radiating element 122 so that the RF lens 240 may bend such radiation in a manner that provides an improved shape for the antenna beam generated by the 3.5/5 GHz radiating elements 122. The RF lenses 240 may be formed of any suitable dielectric material that steers RF energy. The RF lenses 240 may be fabricated from materials that are both lightweight and inexpensive in some embodiments. In some embodiments, the RF lenses 240 may be formed of polyethylene, polypropylene, expanded polypropylene, acrylonitrile-butadiene-styrene (ABS), polystyrene or expanded polystyrene, each of which are commonly available thermoplastic materials As shown in FIGS. 6A-6B, an outer (front) surface of each RF lens 240 may have a generally convex shape along the elevation plane. In other words, vertical cross-sections taken through each RF lens 240 may have a generally convex outer surface (where the outer/front surface of each RF lens 240 is the portion of the RF lens 240 that is farthest from the tubular reflector 110). Moreover, the inner (rear) surface of each RF lens 240 may be generally convex, flat, or concave where the degree of concavity is less than the convexity of the outer surface so that overall each RF lens 240 will have a generally convex vertical cross-sections so that each RF lens 240 will tend to focus RF energy along the elevation plane.

The outer surface of each RF lens 240 also has a generally convex shape along the azimuth plane. As described above, such a shape will also tend to focus the RF energy in the azimuth plane. The RF lenses 240, however, may have one or more additional features that are designed to spread out (defocus) the antenna beam in the azimuth plane. In the present embodiment, each RF lens 240 has two features that act to defocus the RF energy in the azimuth plane, which may provide improved antenna patterns.

First, each RF lens 240 may have an inner surface that has horizontal cross-sections that have generally concave profiles. The concavity of the inner surface may act to defocus RF energy emitted by the radiating element 122 associated with the RF lens 240 in the azimuth plane. FIG. 6C is a perspective view of an interior surface of the RF lens 240 that illustrates the shape thereof. As can be seen, the concave horizontal cross-sections form a recess 246 in the inner surface of the RF lens 240. In some embodiments, the outer portion of each radiating element 122 may be within the recess 246 of its associated RF lens 240.

Second, as can be seen in FIGS. 6A-6C, holes 242 are drilled through each RF lens 240. In the depicted embodiment, eleven vertically-extending columns 244 of holes 242 are formed through each the RF lens 240. Each hole 242 may be filled with air. Air will have a different dielectric constant than the material used to form the RF lenses 240. Thus, each RF lens 240 may be viewed as being formed of two different materials (namely the lens material and air) that have different dielectric constants. Since the dielectric constant of the RF lens 240 impacts how much the RF radiation is bent (i.e., focused or defocused), the provision of the air holes 142 may be used to further change the shape of the antenna beam in a desired fashion.

As shown in FIGS. 6A-6C, the holes 242 have different diameters, with the holes 242 in the central vertically-extending columns 244 having larger diameters than the holes 242 forming the outside vertically-extending columns 244. Since air has a dielectric constant of 1, whereas the dielectric material used to form the remainder of each RF lens 240 will have a higher dielectric constant (e.g., between 1.5 and 4.5), the "effective thickness" of the portion of each RF lens 240 having air holes 242 will be reduced in comparison to the remainder of the RF lens 240. Herein, the "effective thickness" of a portion of an RF lens that is formed of materials having different dielectric constants is the physical thickness of an RF lens formed solely of the lens material that has the highest dielectric constant that would bend RF radiation the same amount as that portion of the RF lens. Thus, the "effective thickness" takes into account how the use of lower dielectric constant material reduces the ability of portions of an RF lens to bend the RF radiation.

The effect of the air holes 242—which have a low dielectric constant—is to reduce the effective thickness of the RF lens 242 in the region where the air holes 242 are provided. Another way of viewing the impact of the air holes 242 (or other dielectric materials that have a different dielectric constant than a base material of the RF lens 240) is that the first and second dielectric materials having first and second dielectric constants may be viewed as a single dielectric material that has an "effective dielectric constant" that is equivalent to the blended combination of the first and second dielectric materials. Thus, the "effective dielectric constant" is the dielectric constant of an RF lens that has the same shape that would bend the RF radiation the same amount as the RF lens that is formed of the first and second dielectric materials.

As shown in FIGS. 6A-6C, the air holes 242 extend in a generally vertical direction through the center of each RF lens 242. Thus, the effective thickness of the portion of the RF lens 240 that extends vertically through the center of the RF lens 240 is reduced. Moreover, since the air holes 242 in the central columns 244 have larger diameters, the effective thickness of the RF lens 240 is further reduced in a vertically-extending strip through the center of the RF lens 240. The net effect of the air holes 242 thus is to give each RF lens 240 an effective concave shape along horizontal cross-sections thereof since the larger air holes 242 decrease the effective thickness of the central portion of the RF lens 240, with a greater decrease in the middle portion of the lens 240. Thus, each RF lens 240 may have a horizontal cross-section having, for example, a relatively constant physical thickness and the air holes 242 give the RF lens 240 its concave property in the azimuth plane.

It will be appreciated that, in other embodiments, characteristics of the air holes 242 other than the size thereof may be varied. For example, in another embodiment, the depth of the air holes 242 may be varied, with some air holes 242 extending further through the RF lens 240 than other of the air holes 242. As another example, the density of the air holes 242 (i.e., the number of air holes 242 per unit area) may be varied in different locations throughout the RF lens 240. These techniques may also be combined.

Figure 6D:
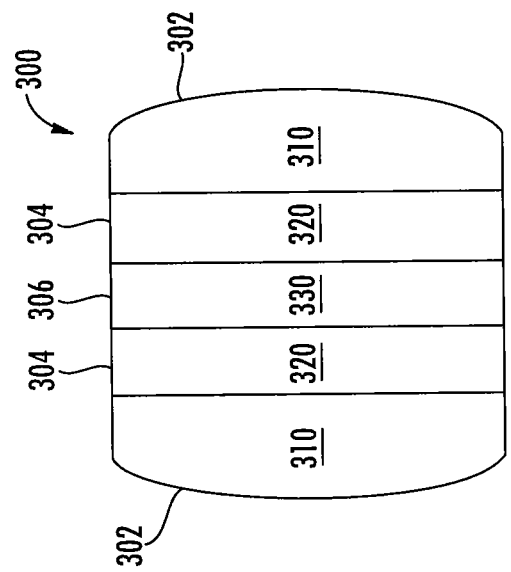
FIG. 6D is a schematic front view of an alternative RF lens that may be used in the base station antenna of FIG. 6A.
Figure 7A:
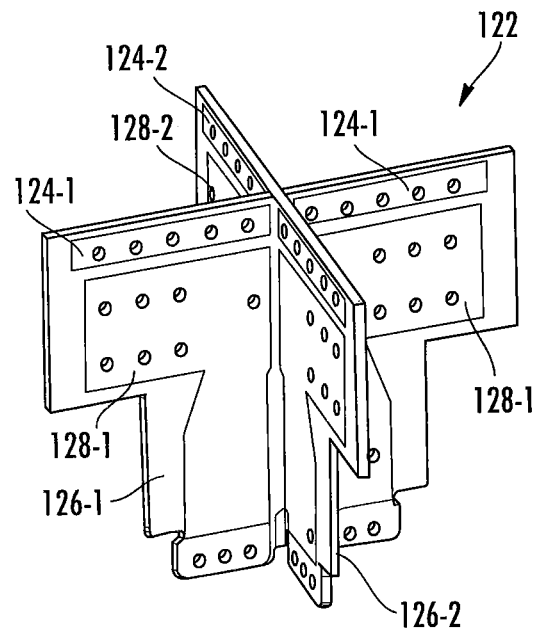
FIGS. 7A-7D are various views illustrating an example radiating element that could be used to implement the 3.5/5 GHz radiating elements included in the base station antenna of FIG. 6A.
Figure 7B:
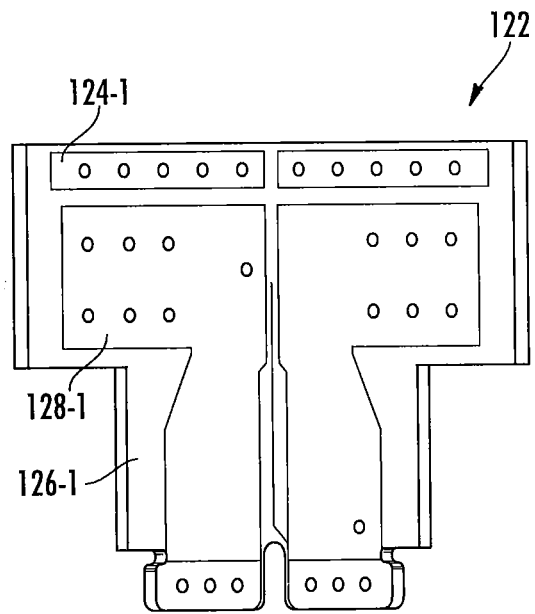
Figure 7C:
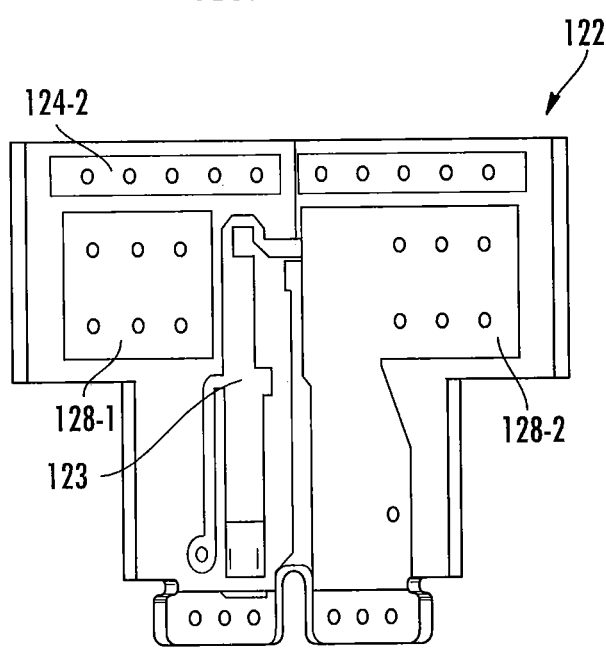
Figure 7D:
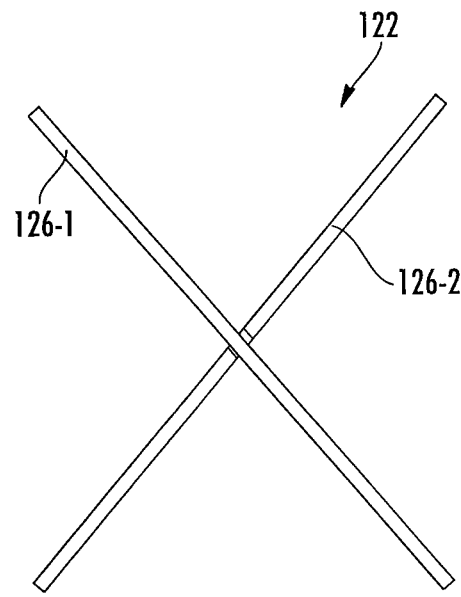

While FIGS. 6A-6C show RF lenses 240 that uses air holes 242 to give the RF lens 240 an effective concave shape along the azimuth plane, it will be understood that more generally this can be accomplished by forming the RF lenses using materials having different dielectric constants. For example, FIG. 6D schematically illustrates an alternative RF lens 300 that is formed by using three different materials, namely a high dielectric constant material 310 that is used to form the outer sections 302 of the RF lens 300, a low dielectric constant material 330 that is used to form the central portion 306 of the RF lens 300, and an intermediate dielectric constant material 320 that is used to form portions 304 of the RF lens 300 that are between the central portion 306 and the outer portions 302. The use of the three materials 310, 320, 330 having different dielectric constants allows the RF lens 300 to defocus RF energy in the azimuth plane, while the generally convex shape of the RF lens 300 allows the RF lens 300 to focus RF energy in the elevation plane. More or fewer materials having different dielectric constants may be used.

Each RF lens 240 of FIGS. 6A-6C may have a generally convex vertical profile that focuses the RF radiation in the elevation plane and air holes 242 that make the effective thickness of horizontal cross-sections of the RF lens 240 have a concave shape that defocuses the RF radiation in the azimuth plane. It will be appreciated that in other embodiments RF lenses may be provided that have horizontal cross-sections that have generally concave physical shapes so that the RF lens defocuses the RF radiation in the azimuth plane, and which further includes air holes which are provided so that a vertical cross-section of the RF lens will effectively have a convex shape in order to focus the RF radiation in the elevation plane. This can be accomplished, for example, by varying the diameter, depth and/or density of the air holes in the vertical direction.

Figure 8:
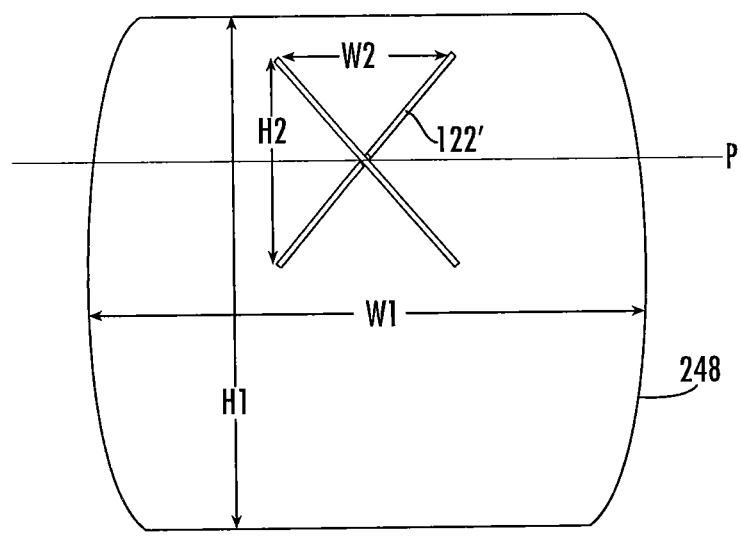
FIG. 8 is a schematic front view illustrating the relative sizes and placement of one of the RF lenses and 3.5/5 GHz radiating elements included in the base station antenna of FIG. 6A.

As noted above, the RF lenses 240 may be substantially larger than the RF lenses 140 included in the base station antenna 100. This is schematically illustrated in FIG. 8. In FIG. 8, the bold lines show the perimeter 248 of the RF lens 240 when viewed from the front. Only the perimeter 248 of the RF lens 240 is shown so that the radiating element 122 that is mounted behind the RF lens 240 can also be seen.

As shown in FIG. 8, the RF lens 240 may have a maximum width W1 and a maximum height H1. Likewise, the radiating element 122 may have a maximum width W2 and a maximum height H2. In some embodiments, the maximum width W1 of each RF lens 240 may be at least 1.5 time larger than the maximum width W2 of its associated radiating element 122. Likewise, in some embodiments, the maximum height H1 of each RF lens 240 may be at least 1.5 time larger than the maximum height 112 of its associated radiating element 122. In other embodiments, the maximum width W1 of each RF lens 240 may be at least twice the maximum width W2 of its associated radiating element 122 and/or the maximum height H1 of each RF lens 240 may be at least twice the maximum height H2 of its associated radiating element 122. This may ensure that the vast majority of the RF radiation emitted by each radiating element 122 passes through its associated RF lens 240.

While the larger RF lenses 240 provide increased focusing and allow the use of a single radiating element 122 per backplane 112, the increased size of the RF lenses 240 may also be disadvantageous, because it can increase the physical size of the base station antenna 200, and may also increase the weight and cost of the antenna 200 by requiring a larger housing/radome. However, since the base station antenna 200 includes the 2 GHz linear arrays 130, the diameter of the radome must necessarily be large enough to enclose the radiating elements 132, which may be, for example, nearly twice the size of the 3.5/5 GHz radiating elements 122. Thus, the additional increase in the size of the radome that may be required to accommodate use of the larger RF lens 240 may be acceptable in these circumstances. Moreover, if the antenna 200 included radiating elements that are designed to operate in lower frequency bands such as the 696-960 frequency band, then the low-band radiating elements may be larger than the RF lenses 240 so that inclusion of the RF lenses 240 may not require any additional increase in the size of the antenna 200.

As can best be seen in FIGS. 6B and 8, each radiating element 122 is mounted behind an upper portion of its associated RF lens 240. As a result, about ⅔ to ¾ of each RF lens 240 may be positioned below a horizontal plane P that bisects its associated radiating element 122 as is schematically shown in FIG. 8. As described above with reference to FIG. 3, by mounting the RF lens so that most of the lens material is below the horizontal center of the radiating element 122 the RF lens will tend steer the RF radiation downwardly. This may facilitate obtaining compliance with the FCC requirements for emissions in the UNII-1 frequency band.

Figure 9:
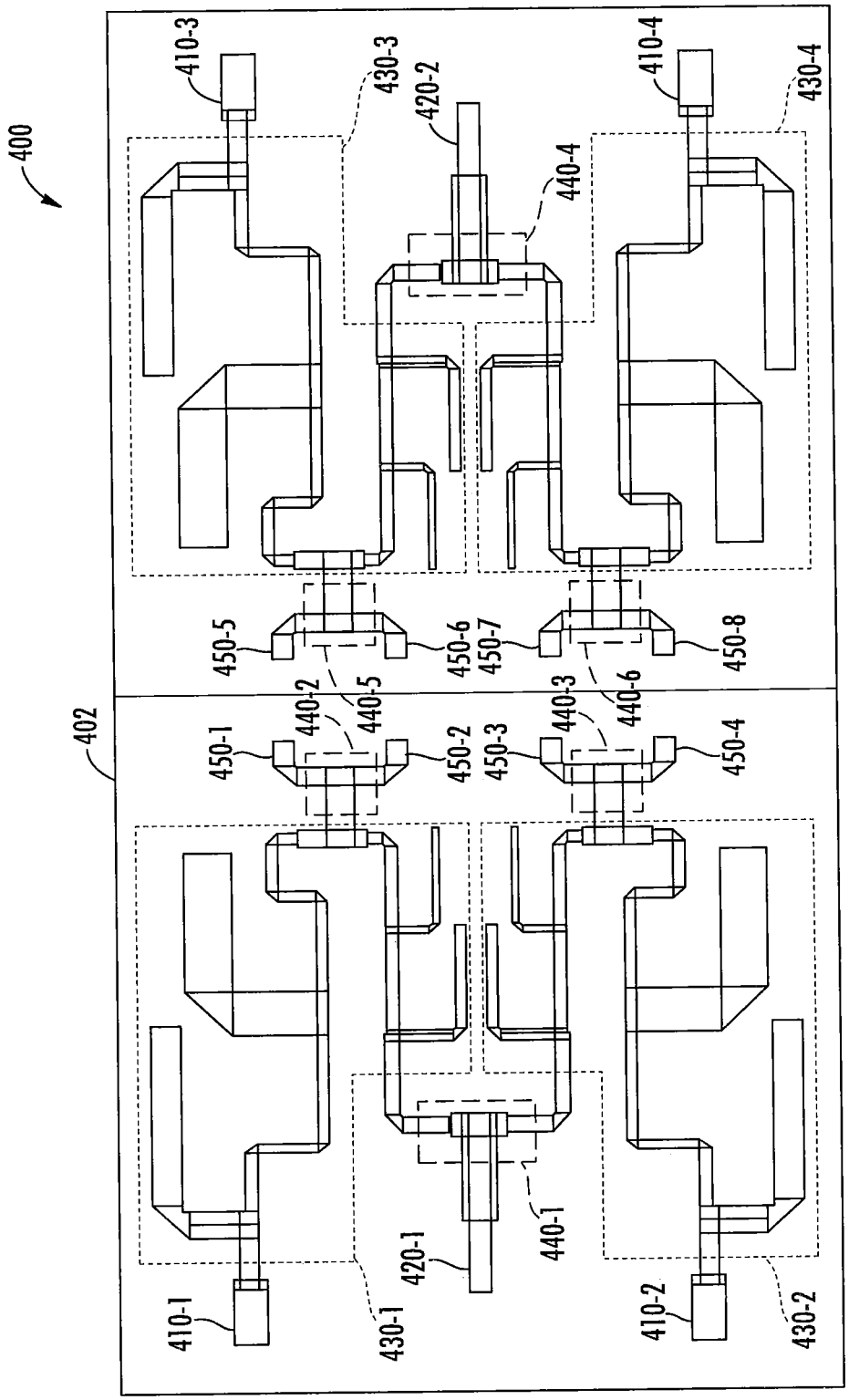
FIG. 9 is a plan view of a feed network for the 3.5 GHz/5 GHz radiating elements that are included in the base station antenna of FIG. 6A.

FIG. 9 is a plan view of a feed network 400 for the 3.5 GHz/5 GHz radiating elements 122. As shown in FIG. 9, the feed network 400 may be implemented in a printed circuit board 402. The feed network 400 may connect both a 3.5 GHz radio and a 5 GHz radio (not shown) to the radiating elements 122. The 3.5 GHz radio may have four ports (two ports for each polarization) while the 5 GHz radio may have two ports (one port for each polarization). Duplexing of the transmit and receive channels is performed internal to the radios, so each radio port passes both transmitted and received RF signals.

The feed network 400 has six inputs 410-1 through 410-4 and 420-1, 420-2. Inputs 410-1 through 410-4 may be connected to the four respective ports on the 3.5 GHz radio, and inputs 420-1 and 420-2 may be connected to the two respective ports on the 5 GHz radio. The ports 410-1 through 410-4 and 420-1, 420-2 may each be implemented as a metal pad. The feed network 400 may include eight outputs 450-1 through 450-8. Outputs 450-1 and 450-5 are coupled to the first of the radiating elements 122, outputs 450-2 and 450-6 are coupled to the second of the radiating elements 122, outputs 450-3 and 450-7 are coupled to the third of the radiating elements 122, and outputs 450-4 and 450-8 are coupled to the fourth of the radiating elements 122. In each case, one of the outputs 450 connects to the balun 123 that is attached to the −45° dipole arms of the radiating element 122 and the other of the outputs 450 connects to the balun 123 that is attached to the +45° dipole arms of the radiating element 122. While ports 410-1 through 410-4 and 420-1, 420-2 are referred to as "inputs" and ports 450-1 through 450-8 are referred to as "outputs"—which describe the case when the antenna 200 is transmitting RF signals—it will be appreciated that when the antenna 200 is receiving RF signals that ports 450-1 through 450-8 will operate as "inputs" and that ports 410-1 through 410-4 and 420-1, 420-2 will operate as "outputs" due to the reversal of the direction of travel of the RF signals.

As shown in FIG. 9, the 3.5 GHz inputs 410-1, 410-2 may be connected to first inputs of first and second diplexers 430-1, 430-2. The 5 GHz input 420-1 is connected to an input of a first power coupler 440-1. In FIG. 9, the diplexers 230 are shown within the dotted boxes and the power couplers 440 are shown within the dashed boxes. The outputs of the first power coupler 440-1 may be connected to second inputs of the first and second diplexers 430-1, 430-2, respectively. The first and second diplexers 430-1, 430-2 may (for signals travelling in the transmit direction) each receive both a 3.5 GHz signal and a 5 GHz signal and combine those signals and output the combined signals to respective second and third power couplers 440-2, 440-3. The outputs of second power coupler 440-2 may be supplied to respective ones of a first pair of opposed radiating elements 122, and the outputs of the third power coupler 440-3 may be supplied to respective ones of a second pair of opposed radiating elements 122.

Likewise, the 3.5 GHz input ports 410-3, 410-4 may be connected to first inputs of the third and fourth diplexers 430-3, 430-4, respectively. The 5 GHz input 420-2 is connected to an input of a fourth power coupler 440-4. The outputs of the fourth power coupler 440-4 may be connected to second inputs of the third and fourth diplexers 430-3, 430-4. The third and fourth diplexers 430-3, 430-4 may each receive both a 3.5 GHz signal and a 5 GHz signal and combine those signals and output the combined signals to respective fifth and sixth power couplers 440-5, 440-6. The outputs of the fifth power coupler 440-5 may be supplied to respective ones of a first pair of opposed radiating elements 122, and the outputs of the sixth power coupler 440-6 may be supplied to respective ones of a second pair of opposed radiating elements 122.

Figure 10A:
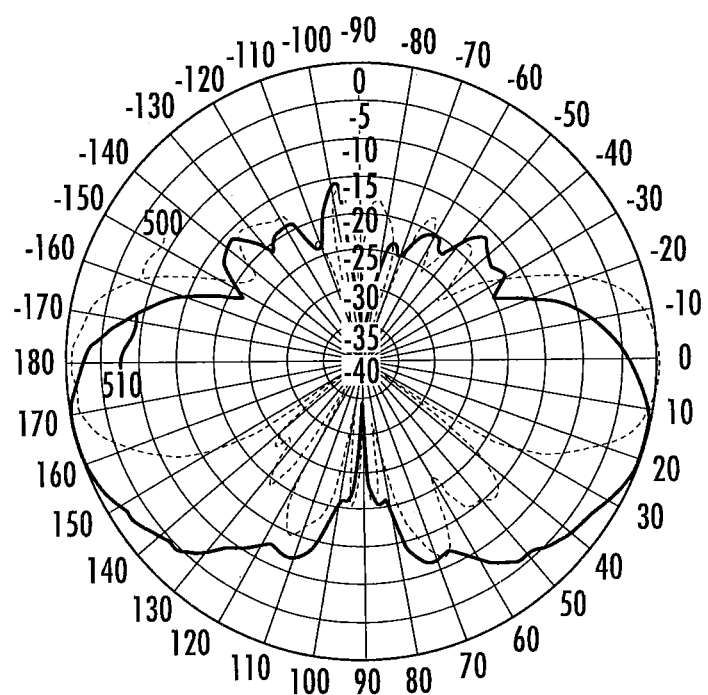
FIGS. 10A and 10B are, respectively, modelled 5 GHz elevation and azimuth patterns for the base station antenna of FIG. 6A.

The base station antenna 200 may provide improved performance as compared to the base station antenna 100. This can be seen with reference to FIGS. 10A and 10B, which are graphs that compare the 5 GHz elevation and azimuth patterns of each antenna. In FIG. 10A, curve 500 shows the 5 GHz elevation pattern for the base station antenna 100 while curve 510 shows the 5 GHz elevation pattern for the base station antenna 200. It can be seen from curve 500 that the RF lenses 140 act to direct some of the upwardly-directed radiation downwardly. This effect is even more pronounced in the base station antenna 200, as curve 510 shows that the boresight pointing direction for the antenna beam is moved to below the horizon and excellent suppression of the upper sidelobes is achieved. The increased downtilt of the main lobe of the antenna beam in the elevation plane shown in curve 510 moves the upper edges of the main lobe away from the envelope corresponding to the UNII-1 requirements, facilitating compliance therewith.

Figure 10B:
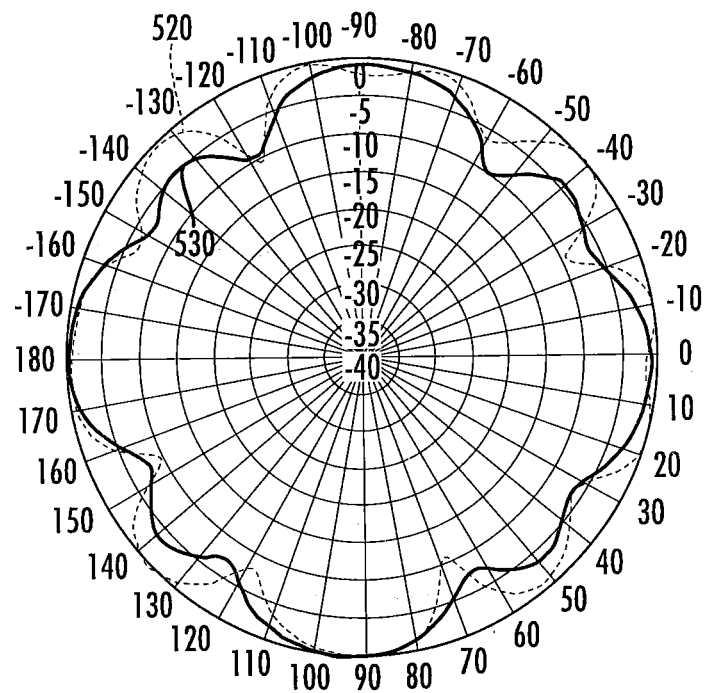

Referring next to FIG. 10B, curve 520 shows the 5 GHz elevation pattern for the base station antenna 100 while curve 530 shows the 5 GHz elevation pattern for the base station antenna 200. It should be noted that curves 520 and 530 are normalized to the same peak gain. It can be seen by comparing curves 520 and 530 that there is less ripple in the 5 GHz elevation pattern for the base station antenna 200. The only potential disadvantage in curve 530 as compared to curve 520 is the slightly deeper (but narrower) nulls, but in most small cell base station implementations these narrow nulls tend to fill in such that in practice this likely is not an actual disadvantage.

Figure 11:
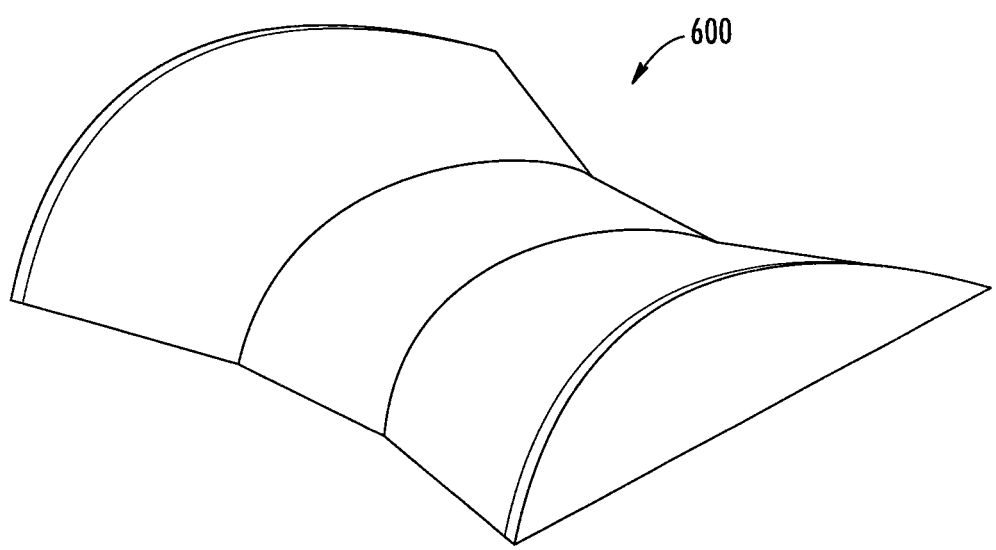
FIG. 11 is a schematic diagram showing an RF lens according to further embodiments of the present invention.

FIG. 11 is a schematic diagram showing an RF lens 600 according to further embodiments of the present invention that may be used, for example, in place of the RF lenses 240 that are described above. As shown in FIG. 11, an outer surface of the RF lens 600 has a generally convex shape along the elevation plane while having a generally concave shape along the azimuth plane. The RF lens 600 may provide antenna patterns similar to the RF lens 240 using shaping of the lens material along the azimuth plane to defocus the azimuth pattern instead of using materials having different dielectric constants as is the case with the RF lens 240.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station antenna, comprising:
    a reflector having a plurality of outer faces that are arranged as pairs of outer faces that face in opposite directions;
    a connector port;
    a plurality of radiating elements mounted to extend outwardly from the respective outer faces of the reflector, where each of the radiating elements is coupled to the connector port; and
    a plurality of radio frequency ("RF") lenses, each RF lens mounted outwardly of a respective one of the radiating elements and associated with the respective radiating element;

wherein the number of radiating elements coupled to the connector port is equal to the number of outer faces of the reflector.

2. The base station antenna of claim 1, wherein each RF lens is configured to re-direct a first portion of an RF signal emitted by its associated radiating element downwardly that exceeds a second portion of the RF signal emitted by its associated radiating element that is redirected upwardly.

3. The base station antenna of claim 1, wherein each RF lens is configured to focus at least a portion of the RF energy emitted by its associated radiating element in an elevation plane when the base station antenna is mounted for use.

4. The base station antenna of claim 1, wherein each RF lens is configured to defocus at least a portion of the RF energy emitted by its associated radiating element in an azimuth plane when the base station antenna is mounted for use.

5. The base station antenna of claim 1, wherein each RF lens is configured to at least partially focus the RF energy emitted by its associated radiating element in an elevation plane while at least partially defocusing the RF energy emitted by its associated radiating element in an azimuth plane when the base station antenna is mounted for use.

6. The base station antenna of claim 1, wherein a rear surface of a horizontal cross-section of a first of the RF lenses has a generally concave shape.

7. The base station antenna of claim 6, wherein an outer surface of a vertical cross-section of a first of the RF lenses has a generally convex shape.

8. The base station antenna of claim 1, wherein a central portion of a first of the RF lenses includes a plurality of holes.

9. The base station antenna of claim 8, wherein at least some of the holes do not extend all the way through the first of the RF lenses.

10. The base station antenna of claim 8, wherein a depth of a first of the holes is greater than a depth of a second of the holes.

11. The base station antenna of claim 8, wherein an area of a vertical cross-section taken along a longitudinal axis of a first of the holes is greater than an area of a vertical cross-section taken along a longitudinal axis of a second of the holes.

12. The base station antenna of claim 8, wherein the plurality of holes define a hole-filled region in each of the RF lenses, and wherein the hole filled region extends vertically through a central portion of the first of the RF lenses.

13. The base station antenna of claim 1, wherein the plurality of radiating elements are configured to generate an antenna beam having a quasi-omnidirectional cross-section in the azimuth plane.

14. The base station antenna of claim 1, wherein a horizontal plane that bisects a first of the radiating elements divides the RF lens associated with the first of the radiating elements into upper and lower portions, and wherein the lower portion has a greater volume than the upper portion.

15. The base station antenna of claim 1, wherein an outer surface of a vertical cross-section of a first of the RF lenses has a generally convex shape.

16. The base station antenna of claim 1, wherein a first RF lens in the plurality of RF lenses is associated with a first radiating element in the plurality of radiating elements, and wherein a maximum width of the first RF lens in an azimuth plane is at least 1.5 times a maximum width of the first radiating element in the azimuth plane and a maximum height of the first RF lens in an elevation plane is at least 1.5 times a maximum height of the first radiating element in the elevation plane.

17. The base station antenna of claim 16, wherein the first RF lens is configured to at least partially focus the RF energy emitted by the first radiating element in the elevation plane while at least partially defocusing the RF energy emitted by the first radiating element in the azimuth plane when the base station antenna is mounted for use.

18. The base station antenna of claim 16, wherein a rear surface of a horizontal cross-section of the first RF lens has a generally concave shape.

19. A base station antenna, comprising:
a reflector having a plurality of faces;
a plurality of radiating elements mounted to extend forwardly from respective faces of the reflector; and
a plurality of radio frequency ("RF") lenses, each RF lens mounted forwardly of a respective one of the radiating elements;
wherein a rear surface of each RF lens has a generally concave cross-section in the azimuth plane and an outer surface of each RF lens has a generally convex cross-section in the elevation plane, and
wherein each radiating element has a different boresight pointing direction in the azimuth plane.

20. The base station antenna of claim 19, wherein each RF lens is configured to re-direct a first portion of an RF signal emitted by its associated radiating element downwardly that exceeds a second portion of the RF signal emitted by its associated radiating element that is redirected upwardly.

* * * * *